Aug. 4, 1964
R. M. PAGE
3,143,733
AUTOMATIC RANGE AND BEARING FOLLOW-UP SYSTEMS
Filed Nov. 20, 1942
8 Sheets-Sheet 1
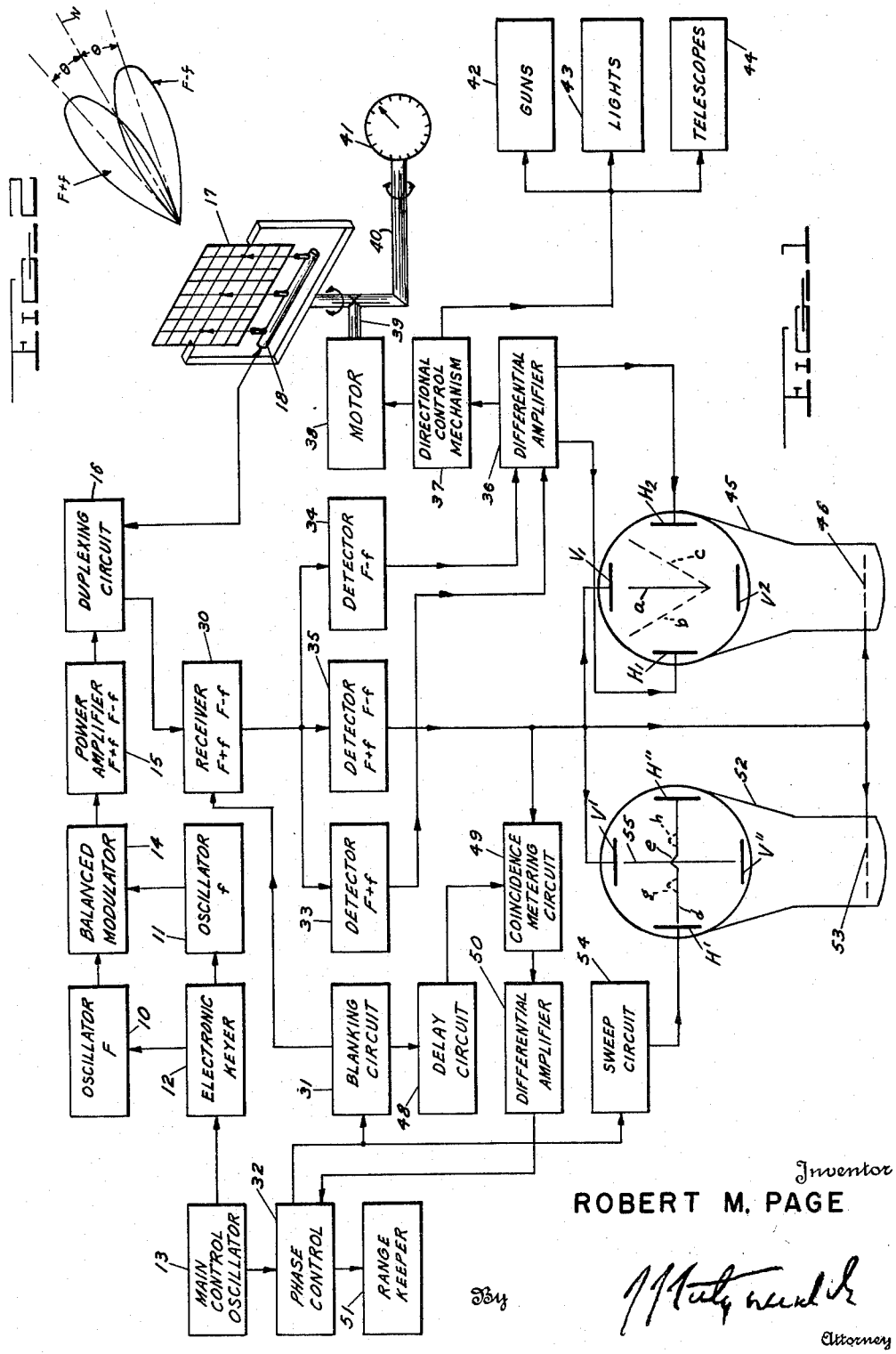
Inventor
ROBERT M. PAGE

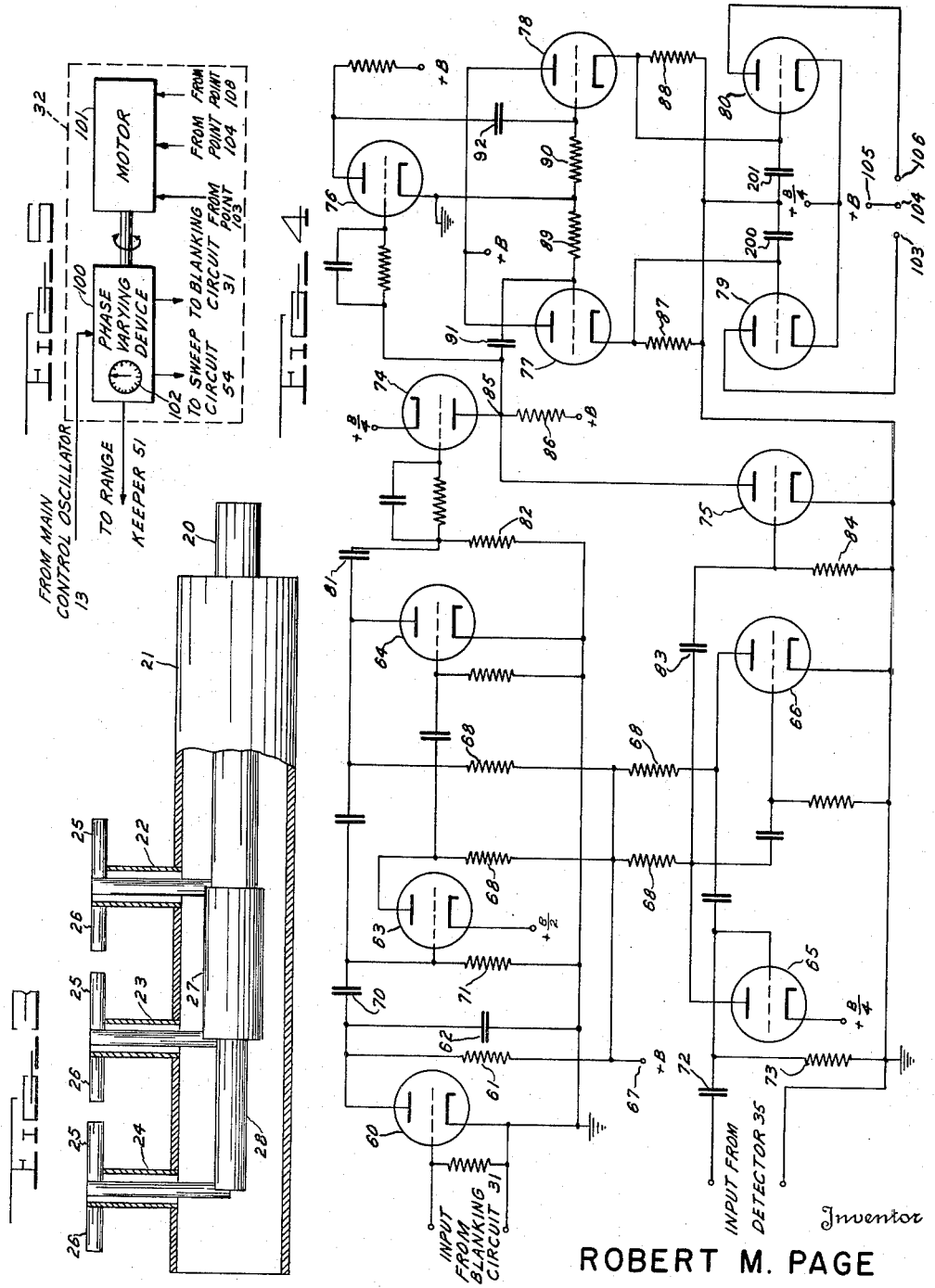

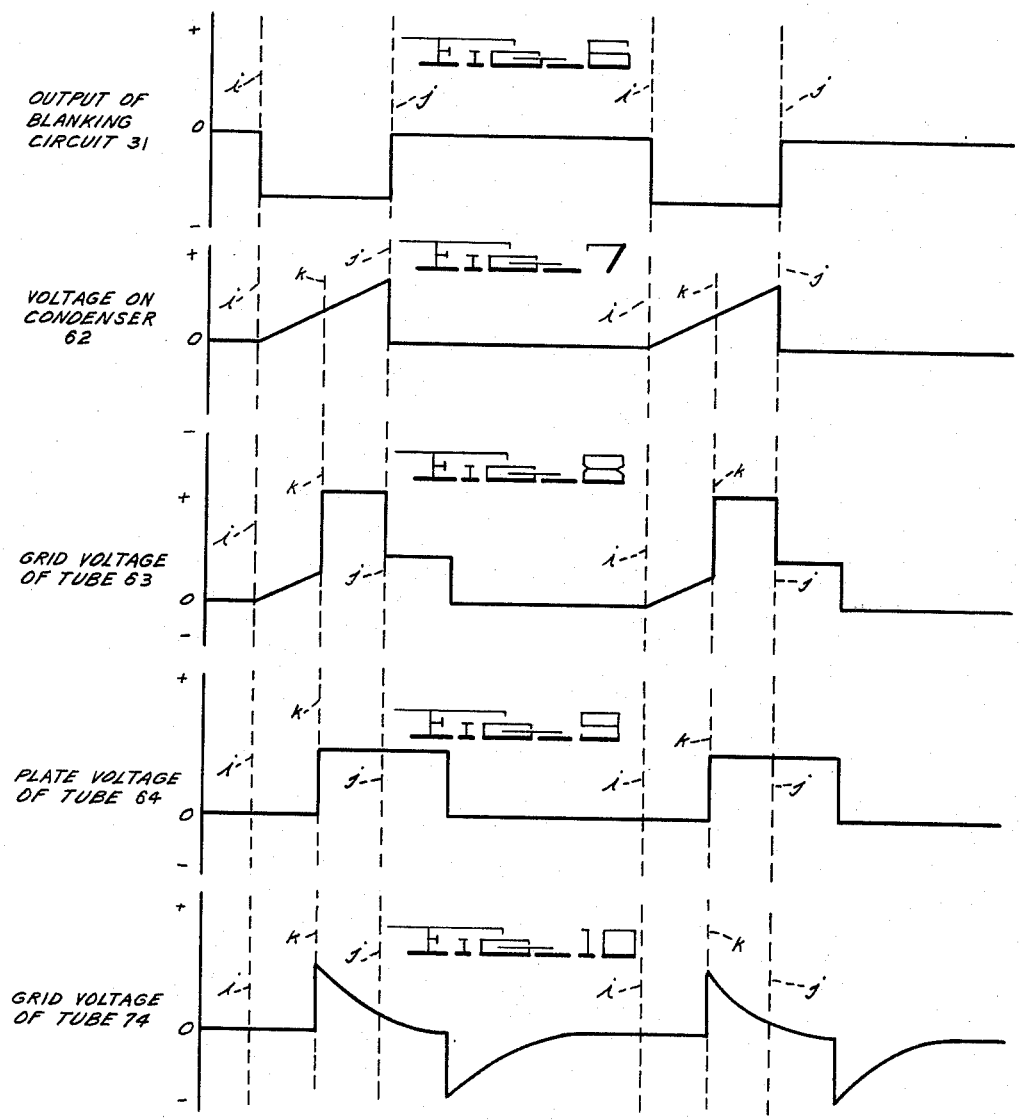

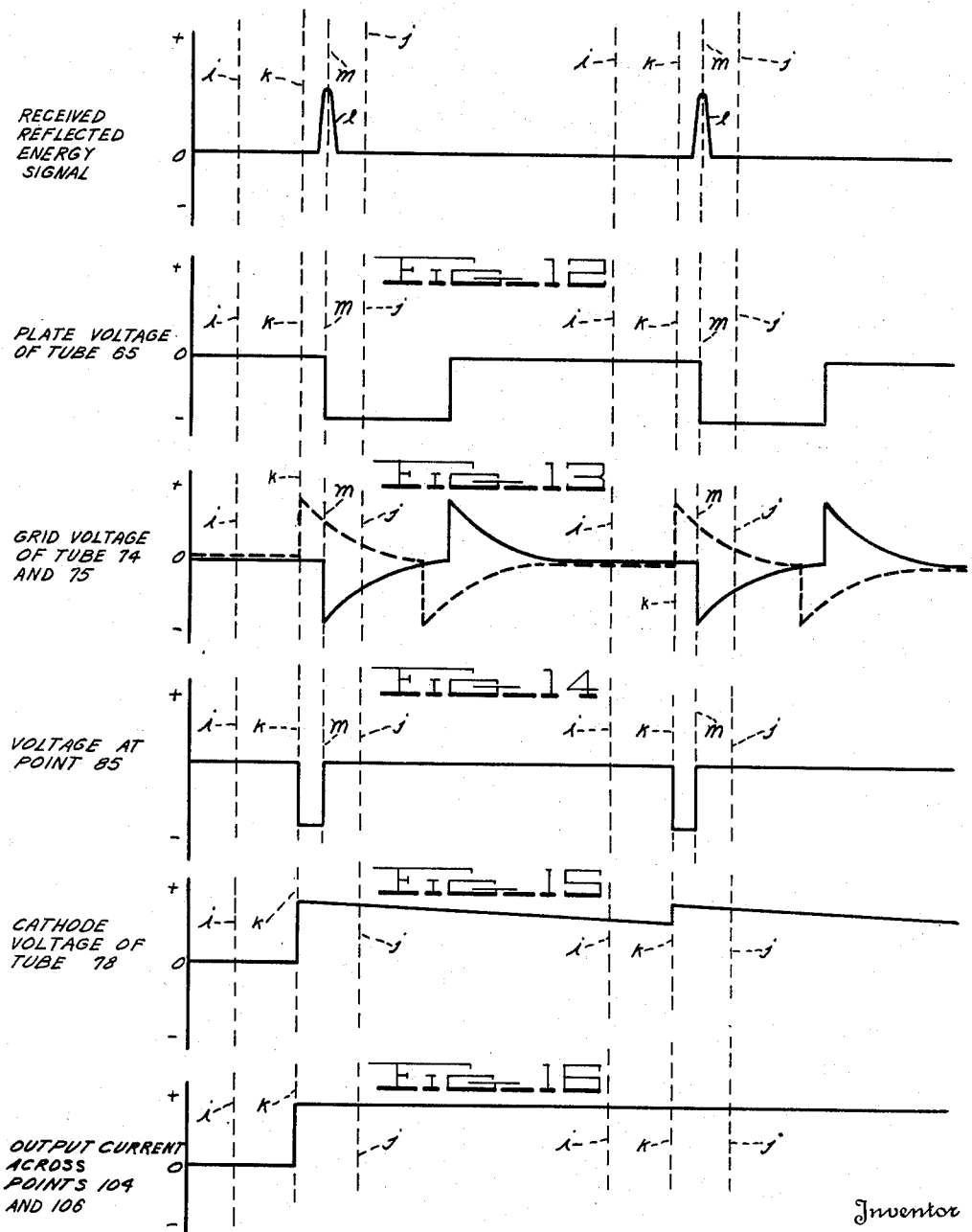

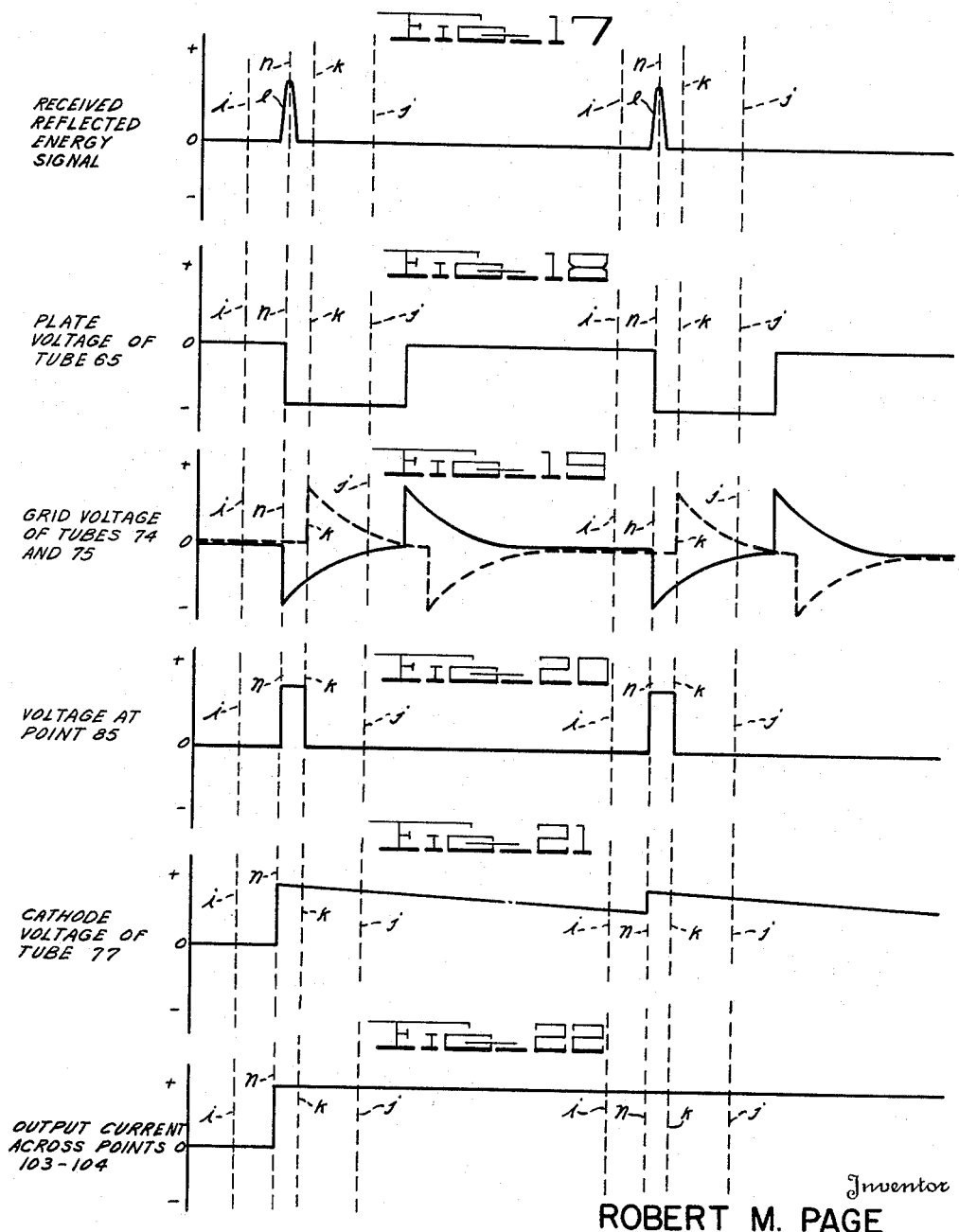

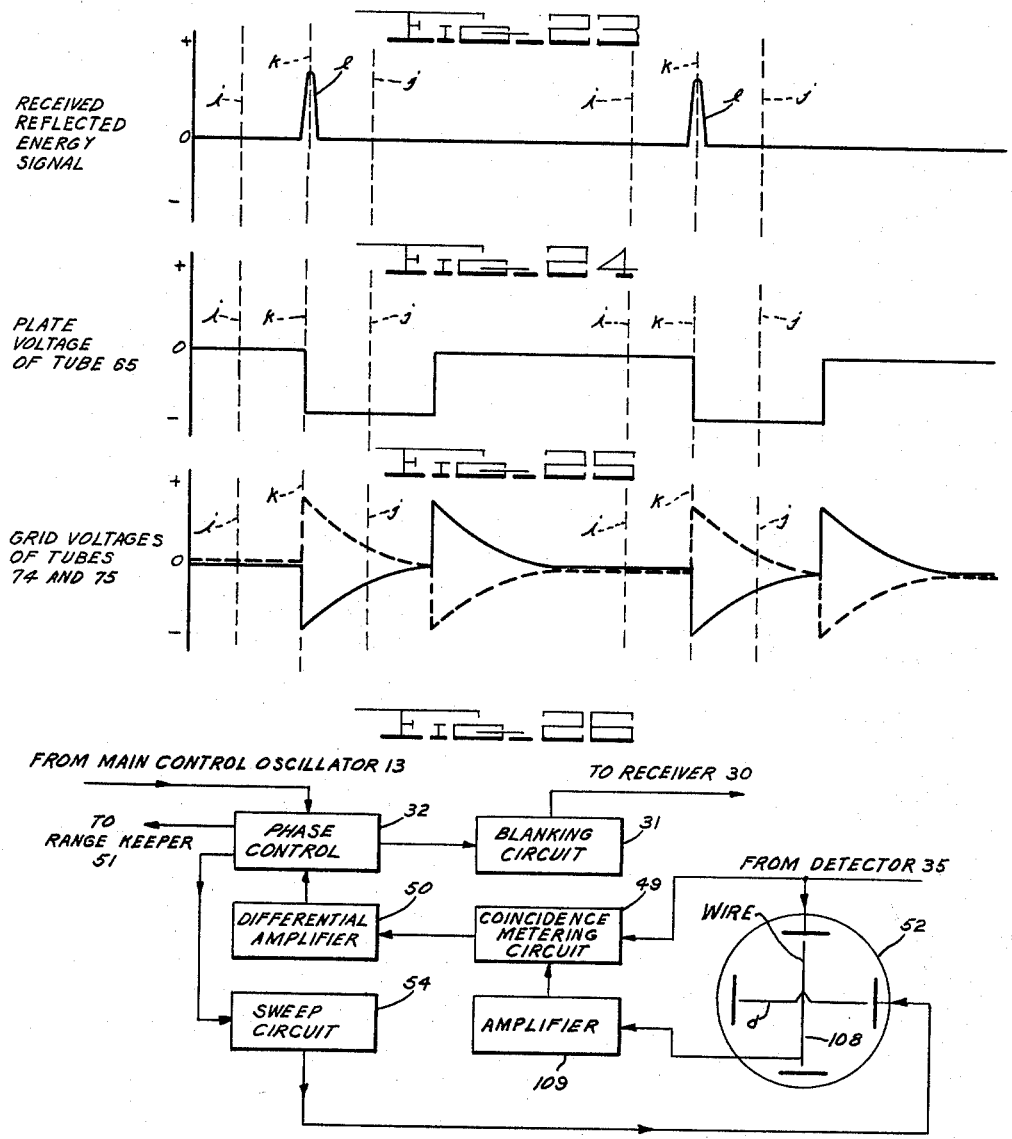

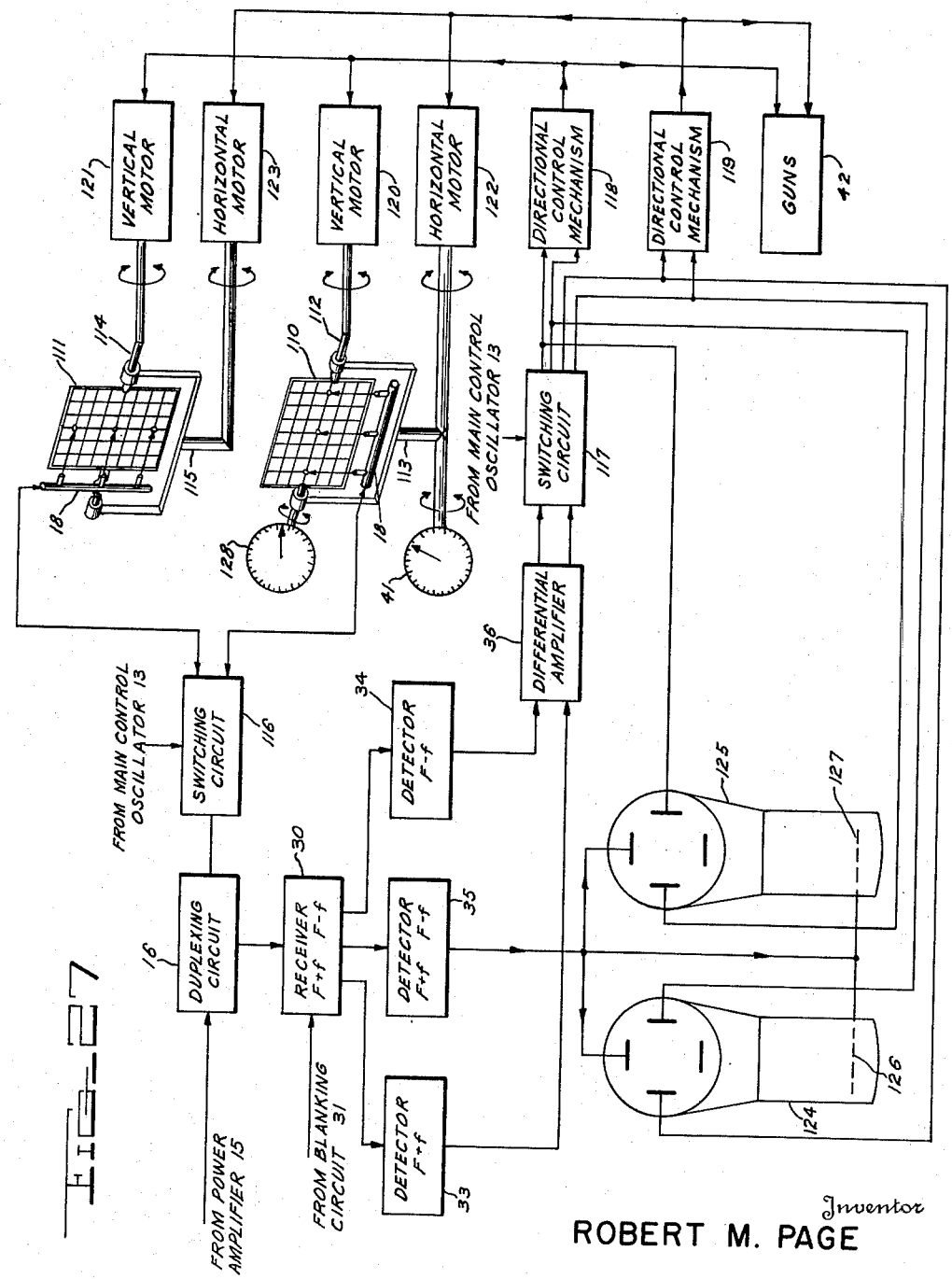

Aug. 4, 1964
R. M. PAGE
3,143,733
AUTOMATIC RANGE AND BEARING FOLLOW-UP SYSTEMS
Filed Nov. 20, 1942
8 Sheets-Sheet 8
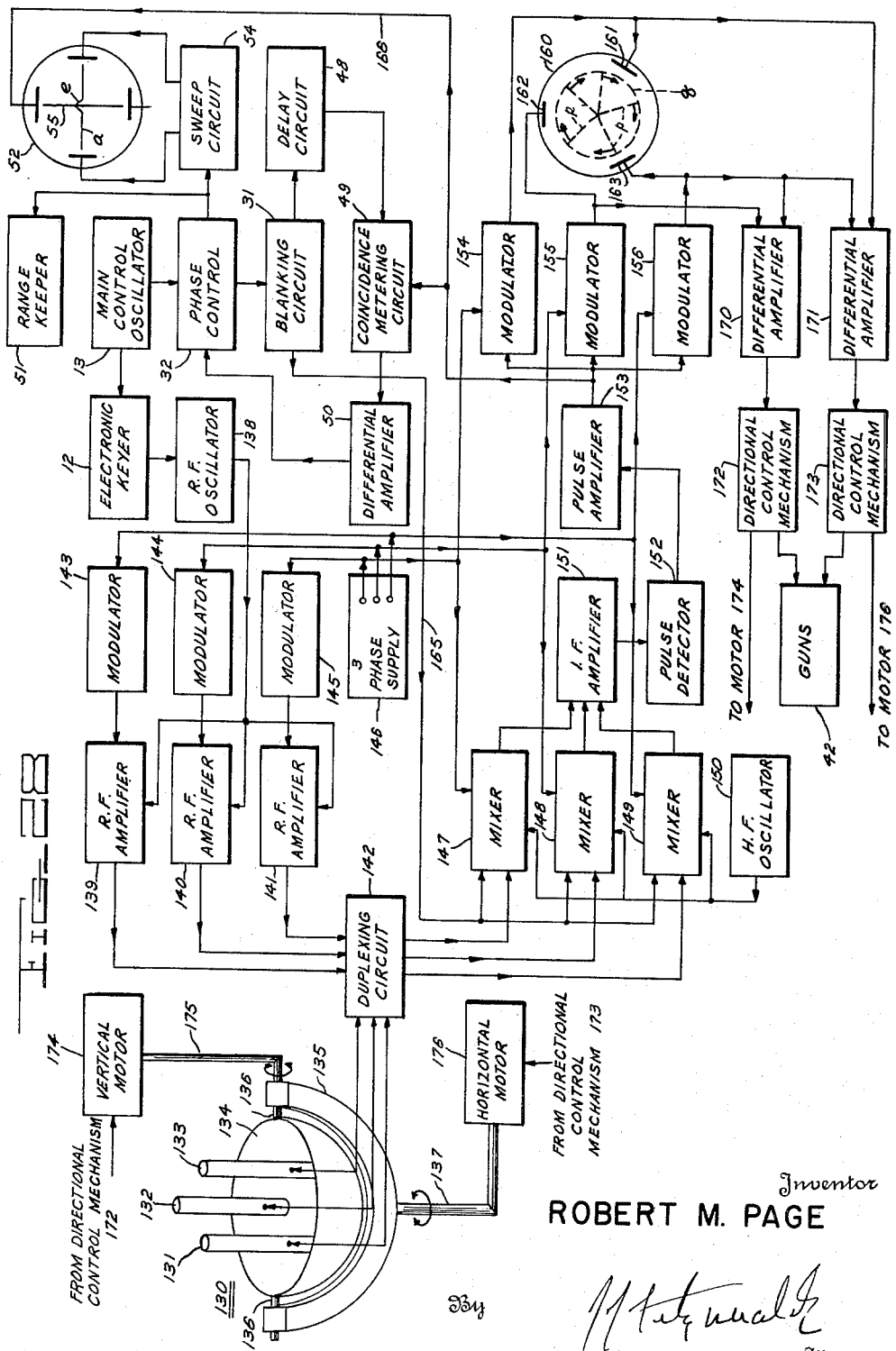
Inventor
ROBERT M. PAGE
Attorney 3,143,733
AUTOMATIC RANGE AND BEARING FOLLOW-UP SYSTEMS
Robert M. Page, % U.S. Naval Research Laboratory, Anacostia Station, Washington, D.C., assignor, by mesne assignments, of eight percent to John Robert Page, sixteen percent to Grace Gowens Leaf, as trustee, twelve and five-sixths percent to La Verne R. Philpott, and thirty-seven and one-half percent to Leo C. Young
Filed Nov. 20, 1942, Ser. No. 466,291
34 Claims. (Cl. 343—9)
(Granted under Title 35, U.S. Code (1952), sec. 266)

This invention relates to radio echo apparatus and more particularly to method of and means for automatically continually determining and indicating range and direction of remote objects with a high degree of accuracy and for continually maintaining an antenna and other devices, such as guns, pointing directly toward a remote object.

Radio echo apparatuses have been disclosed by the prior art that are capable of determining and indicating range and direction of remote objects within certain degrees of accuracy. However, such apparatuses possess certain inherent characteristics which render them ineffective to produce indications of sufficient accuracy so that such indications may be utilized in instances wherein extremely high degrees of accuracy are required, for example, in connection with fire control systems or similar apparatuses. Moreover, the foregoing apparatuses do not include means for automatically continually indicating range and direction of a specific remote object, and continuous manual adjustments are therefore necessary whenever substantially continuous indications of a moving remote object are desired.

The foregoing radio echo apparatuses constructed in accordance with the prior art include means for producing a directional energy beam which comprises a series of equally-spaced radio frequency pulses, means directing the beam toward a preselected area so that energy is reflected from all objects included within such area, means for receiving the reflected energy, means for determining the time intervals between transmission of energy and reception of reflections of such energy and means for indicating the time intervals as a function of range of the remote object from which the energy reflected. In order to indicate range, the prior systems employ a cathode ray oscillograph, or a similar device, upon which a time sweep is impressed whenever an energy pulse is transmitted, with means responsive to receive reflected energy for producing indications on the time sweep, a certain distance from the originating end thereof, that is directly proportional to time required for a transmitted pulse to propagate to a remote object and to reflect from the object to the receiving means, and is therefore substantially directly proportional to the range of such remote object. Indications of all remote objects included within the directional energy beam, as well as spurious indications from noise signals, are apparently simultaneously produced on the sweep, and it is therefore impossible for the operator of the apparatus to rapidly determine range of a specific remote object with a high degree of accuracy. Directional indications of remote objects are obtained from the angular position of the antenna from which the directional energy beam is emitted. Since directional energy beams necessarily have substantial widths, approximately equal to an arc described by an angle of 10 to 15 degrees, it is impossible to obtain directional indications of an accuracy greater than ±10°. Attempts have been made to obtain directional indications of greater accuracy by measuring the strength of the reflected energy and by rotating the antenna until reflected energy of maximum power is received, at which instance it is assumed that the remote object occupies the center of the beam and lies on the normal axis of the antenna. The foregoing attempts have not been satisfactory, since it is difficult to measure the power of reflected energy with sufficient accuracy and since a substantially long period of time is required to determine the proper position of the antenna, especially when remote objects are moving at high velocities, such as aircraft, for example.

It is therefore an object of the present invention to provide a novel method for automatically continually determining and indicating range of a remote object.

Another object is to provide a novel method for determining and indicating direction of a remote object.

Another object is to provide a novel method for automatically continually determining and indicating direction of a moving remote object.

Another object is to provide novel means for automatically continually determining and indicating range of a moving remote object.

Another object is to provide novel means for automatically continually training a directional beam antenna toward a moving remote object in such a manner that the direction of the object is continually obtained from the angular position of the antenna with a high degree of accuracy.

Another object is to provide a novel radio echo apparatus for automatically continually determining and indicating range and direction of a moving remote object with a high degree of accuracy.

Still another object of the present inveniton is to provide a radio echo apparatus including means for indicating range of remote objects as a function of phase and novel means for automatically continually controlling operation of the first-named means in response to range variations of a remote object for continually indicating range of a remote object as a function of phase and the rate of change of range of a remote object as a function of the rate of change of phase.

Still another object is to provide a radio echo apparatus of the foregoing type including transmitting means and a directional beam antenna so characterized to produce a pair of juxtapositioned directional energy beams including novel means responsive to energy reflection from each of said beams to automatically continually train the antenna on a moving remote object whereby continuous bearing indications are obtained.

Still another object is to provide a novel radio echo apparatus for continually indicating bearing, elevation and range of a moving remote object with a high degree of accuracy.

Still another object is to provide in a radio echo apparatus having a directional beam antenna automatic novel means for continually maintaining the antenna pointing directly toward a remote object notwithstanding bearing and elevational variations of the object.

Still another object is to provide a novel radio echo apparatus of the above type including novel means for continually indicating range of the remote object.

Still another object is to provide a radio echo apparatus including novel means for automatically continually receiving energy reflected from a specific remote object and for continually blocking reception of noise signals and energy reflected from other remote objects.

Other objects and features of the invention will appear more fully hereinafter from the following detailed description when considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, wherein similar reference characters denote similar parts throughout the several views:

FIG. 1 is a diagrammatic showing, in block form, of a radio echo apparatus embodying the principles of the present invention;

FIG. 2 is a showing of the directional energy beams produced by the apparatus shown in FIG. 1;

FIG. 3 is a diagrammatic showing, in greater detail, of transmission line 18 of the apparatus disclosed in FIG. 1;

FIG. 4 is a schematic circuit diagram of delay circuit 48, coincidence metering circuit 49 and differential amplifier 50, shown in FIG. 1;

FIG. 5 is a diagrammatic showing of phase control 32 in greater detail;

FIGS. 6 through 25 are voltage and current curves employed for describing operation of the circuit shown in FIG. 4;

FIG. 26 is a diagrammatic showing of another embodiment of the invention;

FIG. 27 is an illustration of a still further embodiment of the invention, and

FIG. 28 is a diagrammatic showing, in block form, of a still further embodiment of the invention.

In accordance with the principles of the present invention, means are provided for continually training a directional beam antenna toward a moving remote object and for indicating the bearing of such remote object from the angular position of the antenna with a high degree of accuracy. In order to accomplish the foregoing it is contemplated by the present invention to provide novel means for simultaneously producing two series of equally spaced energy pulses, with the pulses of each series comprising radio energy at a frequency a predetermined degree greater or less than a mean or fundamental frequency, and a directional beam antenna having a transmission line through which the two series of energy pulses are fed to the various radiating elements of the antenna, with the transmission line so characterized that a pair of directional energy beams, comprising radio frequency pulses at frequencies an equal degree greater and less than the fundamental frequency, are emitted from the antenna in a comman plane at equal angles on opposite sides of the normal axis of the antenna. It is further contemplated to provide means for receiving energy reflections from each of the directional energy beams, means separating the received reflected energy at one frequency from the received reflected energy at the other frequency, means balancing the reflected energy at different frequencies against each other, and to provide means responsive to a difference in power of the reflected energy at different frequencies to automatically continually control the bearing of the antenna so that the juxtapositioned beams are continually maintained equally-distant from the remote object from which the energy reflected. With the foregoing arrangement, whenever the juxtapositioned directional energy beams are equally distant from a remote object, energies of both frequencies are reflected from the remote object at equal strength and are subsequently completely balanced against each other to indicate that the normal axis of the antenna is pointing directly toward the remote object. However, when a remote object is not equally distant from the juxtapositioned directional energy beams, the reflected energy, at a frequency corresponding to the frequency of the energy comprising the beam more adjacent the remote object, is of greater power than the power of the reflected energy at the other frequency, which corresponds to the frequency of the energy comprising the beam less adjacent the remote object. The difference in power is directly proportional to the difference in the distances between the remote object and the directional energy beams, while the frequency of the reflected energy of greatest power determines the direction that the antenna must be rotated in order to move the juxtapositioned beams to a position equally distant from the remote object.

As shown in FIG. 1, the foregoing means comprises radio frequency oscillators 10 and 11 tuned to different frequencies, namely, frequencies F and $f$ respectively. Electronic keyer 12 controls operation of oscillators 10 and 11 in such a manner that each of the oscillators produce a series of radio pulses at frequencies corresponding to the particular frequency that each oscillator is tuned, while main control oscillator 13 produces a timing wave that controls operation of electronic keyer 12 in such a manner that oscillators 10 and 11 simultaneously produce radio frequency pulses at a rate determined by the frequency of main control oscillator 13, which frequency is substantially less than frequencies F and $f$. The pulsating outputs of oscillators 10 and 11 are applied to a conventional balanced modulator 14 wherein the radio pulses at frequencies F and $f$ are balanced against each other and radio pulses at frequencies $F+f$ and $F-f$ are simultaneously produced therefrom in a manner well understood by those skilled in the art. The output of modulator 14 is passed through a power amplifier 15 tuned to frequencies $F+f$ and $F-f$ wherein the radio frequency pulses are suitably amplified, through duplexing circuit 16, the purpose of which will appear more fully hereinafter, to directional beam antenna 17. Antenna 17 is of any conventional directional type having a plurality of radiating elements or antenna sections, not shown, and includes a transmission line 18 through which the elements of the antenna are fed with the output of amplifier 15. As will appear more fully hereinafter, transmission line 18 is responsive to radio pulses at frequencies $F+f$ and $F-f$ to induce currents in the radiating elements of the antenna, in proper phase relations, so that a pair of juxtapositioned directional energy beams, comprising radio pulses at frequencies $F+f$ and $F-f$, are emitted from the antenna. Furthermore, transmission line 18 is so characterized that directional energy beams $F+f$ and $F-f$ are disposed at equal angles $\theta$ on opposite sides of the normal axis N of antenna 17, as shown in FIG. 2, and the antenna is constructed in such a manner that the beams lie in a horizontal plane.

Transmission line 18 is constructed in accordance with the principle disclosed in the application of Robert M. Page, Serial No. 438,321, filed April 9, 1942, now Patent No. 2,660,721, for Radio Echo Ranging Apparatus, and is illustrated in greater detail in FIG. 3 of the drawings. The transmission line is shown in the form of a concentric line comprising central conductor 20 and outside conductor 21, both of which are connected to duplexing circuit 16. Transmission line 18 also includes a series of feed lines 22, 23 and 24, each of which are likewise disclosed in the form of concentric lines having central and outside conductors respectively connected to concentric conductors 20 and 21. In order to more fully illustrate the manner transmission line 18 serially feeds the various radiating elements of antenna 17, feed lines 22, 23 and 24 are shown having connections with conventional dipole radiators each including radiating members 25 and 26, but it is to be expressly understood that other types of radiating members may be employed. Feed lines 22 and 23 are separated by transformer section 27, which has one end thereof connected to central conductor 20, while transformer section 28, connected in concentric relation to the other end of transformer section 27, functions to form a connection between feed lines 23 and 24. Transformer sections 27 and 28 are equal in length to an integral multiple of half-wave lengths, with the wave length corresponding to frequency F, thus providing the proper impedance matching to render the transmission line resonant at frequency F. As clearly outlined in the aforementioned application, transformer sections 27 and 28 have equal values of Q and equal shifts in phase of the current induced in adjacent feed lines or radiating elements is obtained when radio energy is applied to the transmission line at a frequency different from the frequency to which the transformer sections are tuned, namely frequency F. Since the radiating elements of the antenna are serially fed with energy, a uniform progressive phase shift occurs along the series of radiating elements whenever the frequency of the applied energy varies in a manner noted above. A uniform progressive shift in phase of the current induced in the radiating elements produces a uniform deflection of the energy beam emitted from antenna 17, from the normal axis N, in a direction and by a certain degree in accordance with the direction and degree the frequency of the applied energy differs from the resonant frequency F. Since the frequency of the radio pulses simultaneously applied to transmission line 18 from duplexing circuit 16 are equal degrees $f$ greater and less than frequency F, namely frequencies $F+f$ and $F-f$, a pair of directional energy beams are emitted from antenna 17 at equal angles $\theta$ on opposite sides of the normal axis N of the antenna, as shown in FIG. 2.

As mentioned heretofore, means are provided by the present invention for receiving reflected energy from directional energy beams $F+f$ and $F-f$, means for separating the received reflected energy at frequencies $F+f$ and $F-f$, means for balancing the received reflected energies at frequencies $F+f$ and $F-f$ against each other in such a manner to produce a resultant energy signal characterized in accordance with the position of the remote object from which the energy reflected with respect to directional energy beams $F+f$ and $F-f$, and means automatically rotating antenna 17 in accordance with such resultant energy signal to maintain the remote object equally distant from directional energy beams $F+f$ and $F-f$. As shown in FIG. 1, the foregoing means comprises receiver 30, tuned to frequencies $F+f$ and $F-f$, which is connected to transmission line 18 through another channel of duplexing circuit 16. Duplexing circuit 16 functions automatically to form an individual connection between power amplifier 15 and transmission line 18, and an individual connection between the transmission line and receiver 30 so that a single antenna may be employed for transmission as well as reception. Receiver 30 is constructed in such a manner to be normally nonresponsive to transmitted or reflected energy pulses at frequencies $F+f$ and $F-f$, but is unblocked for a short time interval, hereinafter referred to as the "unblocked interval," during which the receiver is responsive to energy at frequencies $F+f$ and $F-f$, upon application of an impulse thereto from blanking circuit 31. Blanking circuit 31 operates in accordance with the timing wave from main control oscillator 13, through phase control 32, to render receiver 30 responsive to reception of reflected energy whenever a pair of radio pulses at frequencies $F+f$ and $F-f$ are simultaneously transmitted. Phase control 32 functions to vary the phase of the timing wave to vary the time that receiver 30 is unblocked following simultaneous transmission of a pair of pulses. Construction and operation of blanking circuit 31 and phase control 32 will appear more fully hereinafter. The output of receiver 30 is passed to detectors 33 and 34, respectively tuned to frequencies $F+f$ and $F-f$, and to detector 35 tuned to frequencies $F+f$ and $F-f$. The outputs of detectors 33 and 34 are applied to differential amplifier 36 of conventional construction. Differential amplifier 36 is designed in such a manner as to produce no energy output whenever energy pulses of equal power at frequencies $F+f$ and $F-f$ are simultaneously applied thereto; and to produce an electrical energy output, of a certain polarity, whenever signals of unequal power at frequencies $F+f$ and $F-f$ are simultaneously fed to the input thereof. More particularly, whenever reflected energy at frequency $F+f$ is of greater power than reflected energy at frequency $F-f$, the output of differential amplifier 36 is of positive polarity, for example, while on the other hand, when the energy at frequency $F-f$ is of greater power than the energy at frequency $F+f$, the output of the differential amplifier is of negative polarity. The output of amplifier 36 is fed to directional control mechanism 37 which includes means responsive to the negative or positive output of amplifier 36 to supply the proper current output to control operation of motor 38, which rotates antenna 17 through shaft 39, to maintain the normal axis N of the antenna continually pointing directly toward the remote object from which the energy reflected. Antenna 17 and motor 38 are also rotatably connected, through shaft 40, to azimuth indicator 41, from which the bearing of the antenna, or the direction the normal axis N is pointing in a horizontal plane is obtained. The output of directional control mechanism 37 is also utilized for controlling the bearing of other elements which are desired to be accurately trained toward a remote object, for example, guns, lights or telescopes, diagrammatically shown in FIG. 1 at 42, 43 and 44, respectively.

Means are also provided by the present invention for indicating the relative positions of directional energy beams $F+f$ and $F-f$ and the remote object, in order to determine the accuracy of the bearing indication produced on azimuth indicator 41. Such means comprises cathode ray oscillograph 45 which includes a pair of vertical deflection plates, $V_1$ and $V_2$, a pair of horizontal deflection plates, $H_1$ and $H_2$, intensity control grid 46, and means not shown, for generating a beam of electrons. The output of detector 35 is applied to the vertical deflection plates and to intensity control grid 46, while the output of differential amplifier 36 is fed to the horizontal deflection plates. Whenever energy passes through detector 35 the electron beam of oscillograph 45 is swept upwardly, as viewed in the drawing, while at the same time the intensity of the electron beam is modulated in such a manner as to render the sweep of the electron beam visible. When no signals are applied to the horizontal deflection plates, that is, when the outputs of detectors 33 and 34 are of equal power, the visible trace produced on the oscillograph screen occupies a true vertical position $a$, thus indicating that the remote object from which the energy reflected is equally distant from directional energy beams $F+f$ and $F-f$, and therefore the directional indication shown on azimuth indicator 41 is the true bearing of the object. When the energy output of detector 33 is of greater power than the output of detector 34, a certain potential is applied to one of the horizontal deflection plates, simultaneously with application of the energy to the vertical deflection plate and grid 46, to deflect the trace toward the left, as viewed in the drawing, by an amount directly proportional to the difference in power between the outputs of detectors 33 and 34, as shown by broken line $b$. An indication of the latter type shows that the remote object is more adjacent directional energy beam $F+f$ and that the antenna must be rotated toward beam $F-f$ to obtain an accurate bearing indication. If the remote object is more adjacent directional energy beam $F-f$, the energy output of detector 34 is of greater power than the output of detector 33 and a certain potential is applied across the horizontal deflection plates to deflect the visible trace to the right, as viewed in the drawing, and as shown by broken line $c$, thus indicating the direction and the amount antenna 17 need to be rotated until the normal axis N thereof points directly toward the remote object.

With the foregoing arrangement, phase control 32 is adjusted, in a manner that will appear more fully hereinafter, so that blanking circuit 31 functions to unblock receiver 30 at the proper time to continually receive energy, at frequencies $F+f$ and $F-f$, reflected from a single remote object impacted by directional energy beams $F+f$ and $F-f$. If the remote object is unequally distant from the directional energy beams, the energy outputs of detectors 33 and 34 are of unequal power and differential amplifier 36 produces an output, of a certain polarity determined by the frequency of the energy of greatest power. The output of differential amplifier is fed to directional control mechanism 37, the output of which controls operation of motor 38 so that the latter rotates antenna 17 in the proper direction to move the directional energy beams equally distant from the remote object. As the antenna rotates to move the beams more equally distant from the remote object, the difference in power between the energy outputs at detectors 33 and 34 decreases, and when the remote object is equally distant from the beams, the outputs from detectors 33 and 34 are of equal power and differential amplifier 36 produces no output, thus stopping operation of motor 38. At all times an indication is produced on the viewing screen of oscillograph 45 from which the actual position of the remote object with respect to the directional energy beams is obtained. From the latter indication it can be readily determined whether or not the bearing indication shown by azimuth indicator 41 is the true bearing of the remote object. It is to be expressly understood, therefore, that this arrangement provides means for automatically following a moving target, such as remote aircraft for example, from which bearing indications of absolute accuracy are continually obtained. With regard to the latter, it is to be expressly pointed out that the instant arrangement provides bearing indications of greater accuracy than the prior systems mentioned heretofore since the indications are limited to an infinitesimal arc, namely, a line normal to the antenna, while in the prior apparatus, the accuracy of the bearing indications is limited by a degree proportional to the width of the directional energy beam. It is to be expressly understood also, as will appear more fully hereinafter, that the foregoing arrangement is capable of operation in such a manner as to automatically control the elevation of a directional beam antenna simultaneously with bearing control thereof, for automatically continually following a remote object moving in two planes and for continually indicating bearing and elevation of such object with a high degree of accuracy.

As aforementioned, the radio echo apparatus disclosed in FIG. 1 of the drawings also includes novel means for automatically continually determining and indicating range of a moving remote object with absolute accuracy and for automatically accurately determining and indicating the rate of change of range of such remote object. As aforesaid, blanking circuit 31 operates in accordance with the timing wave from main control oscillator 13 for rendering receiver 30 responsive to reception of energy at frequencies $F+f$ and $F-f$, for a short period of time, referred to as the unblocked interval, whenever energy pulses at frequencies $F+f$ and $F-f$ are simultaneously generated. The unblocked interval is of an extremely short period of time, with respect to the time interval between transmission of simultaneous pulses at frequencies $F+f$ and $F-f$, so that only a single pulse at frequencies $F+f$ and $F-f$ could be passed through receiver 30 during such time interval. Phase control 32 functions to vary the phase of the timing wave from main control oscillator 13 to vary the time blanking circuit 31 operates, and consequently, the time receiver 30 is unblocked, following simultaneous transmission of pulses at frequencies $F+f$ and $F-f$. By varying phase control 32 in such a manner that receiver 30 is unblocked at the proper time to receive only energy pulses reflected from a specific remote object the degree that the phase of the timing wave from main control oscillator 13 is varied is directly proportional to the time required for energy pulses to propagate from antenna 17, to the specific remote object and to be reflected from the remote object to the antenna, which is a function of range of such remote object. As will appear more fully hereinafter, phase control 32 is calibrated in range so that range of remote objects is directly read therefrom.

In order to automatically continually determine and indicate range of a moving remote object means are provided for automatically operating phase control 32 in such a manner that receiver 30 is continually unblocked at the proper time to receive only energy reflections from a preselected remote object, notwithstanding range variations of such object. The foregoing is accomplished by balancing, in time, the received reflected energy pulses from the preselected object against a reference signal synchronized with the output of blanking circuit 31, and by automatically varying the adjustment of phase control 32, in accordance with any time or phase difference between the foregoing signals, in such a manner to vary the output of blanking circuit 31, in time, so that the reference signal is continually generated at the same instant reflected energy pulses are received. As shown in FIG. 1, the above means comprises delay circuit 48, coincidence metering circuit 49 and differential amplifier 50, all of which are disclosed and described more fully hereinafter. The output of blanking circuit 31 is fed to delay circuit 48 wherein the reference signal is generated which comprises a negative pulse that, at all times, initiates at a time corresponding to the intermediate instant of the unblocked interval of receiver 30. The negative output of delay circuit 48 is passed to coincidence metering circuit 49, along with the positive energy pulses from detector 35 that pass through receiver 30 during the unblocked interval, wherein the positive and negative pulses are shaped to the same form. The symmetrical pulse outputs of coincidence metering circuit are fed to differential amplifier 50 wherein the positive and negative pulses are balanced against each other in time. Amplifier 50 is constructed in a conventional manner and produces no output when the signals from coincidence metering circuit 49 are applied thereto at the same instant, but produces a certain output when the signals are not simultaneously applied, with the output having certain characteristics when the reference signal from delay circuit 48 is applied first and having certain other characteristics when the signal derived from received reflected energy pulses is applied to the amplifier prior to the reference signal. Whenever differential amplifier 50 produces an output, the same is fed to phase control 32 to vary the phase of timing wave from main control oscillator 13, in the proper direction and by the proper degree, to vary the time receiver 30 is unblocked in such a manner that the reference signal from delay circuit 48 and the received reflected energy pulses are simultaneously applied to differential amplifier 50. With the foregoing arrangement an automatic range follow-up system is provided. Since phase control 32 is continually automatically operated to maintain receiver 30 unblocked at the proper time, with respect to the time pulses are transmitted, so that reflected energy pulses are continually received at the intermediate instant of the unblocked interval, extremely accurate range indications are obtained from phase control 32. The output of phase control 32 is also fed to range keeper 51, that may be located adjacent the gun 42 for example, which provides an accurate indication of the rate of change of range of a remote object.

In order to determine the accuracy from phase control 32, means are provided for producing an indication which shows the time reflected energy pulses are received during the unblocked interval of receiver 30 with respect to the reference signal. Such means comprises sweep circuit 54 and cathode ray oscillograph 52 which includes a pair of horizontal and vertical deflection plates H'; H" and V', V" respectively, intensity control grid 53 and means, not shown, for generating an electron beam. Sweep circuit 54 is designed in such a manner as to supply the proper voltage to the horizontal deflection plates of oscillograph 52 to sweep the electron beam of the oscillograph in a horizontal plane across the oscillograph screen for a period of time equal to the unblocked interval of receiver 30, shown by sweep line $d$. Sweep circuit 54 is controlled by the timing wave from main control oscillator 13, through phase control 32, so that the electron beam of the oscillograph is swept in the aforesaid manner in synchronism with unblocking of receiver 30. The output of detector 35 is simultaneously applied to the vertical deflection plates and to intensity control grid 43 of oscillograph 52 to produce a visible indication on the trace of the horizontal sweep of the electron beam, whenever reflected energy is received during the unblocked interval, at a position corresponding to the instant reflected energy is received during the unblocked interval of receiver 30. Vertical reference line 55 is provided on the viewing screen of oscillograph 52 in such a manner that the same passes through the center of trace $d$ and therefore corresponds to the intermediate instant of the unblocked interval. When reflected energy is received at the intermediate instant of the unblocked interval of receiver 30, in synchronism with generation of the reference signal, an indication $e$ is produced on trace $d$ that coincides with reference line 55; however, when the reflected energy is received before or after the intermediate instant of the unblocked interval, or out of phase with the reference signal, indications $g$ and $h$ are respectively produced on trace $d$ on opposite sides of reference line 55. From indications $g$ and $h$ the direction and degree the unblocked interval must be moved to receive reflected energy at the intermediate interval thereof is readily determined.

The foregoing is more readily understood with reference to FIG. 4 of the drawings wherein a circuit arrangement including delay circuit 48, coincidence metering circuit 49 and differential amplifier 50 is disclosed. Delay circuit 48 comprises triode vacuum tube 60, the input of which is connected to blanking circuit 31, and resistance 61 and condenser 62 connected across the output of tube 60 for a purpose that will become apparent hereinafter. Coincidence metering circuit 49 comprises a channel responsive to the reference signal from delay circuit 48, that is, tube 60, and another channel responsive to the reflected energy at the output of detector 35. Each of the foregoing channels includes a multi-vibrator circuit, for producing a rectangular pulse. Such rectangular pulses being 180 degrees out of phase and of symmetrical form. The multi-vibrator included in the channel responsive to the output of delay circuit 48 includes triode vacuum tubes 63 and 64 having the inputs and outputs thereof cross-connected in a conventional manner, through suitable condensers, to form a two-stage capacitance coupled amplifier with regenerative feed-back, while the multi-vibrator responsive to the output of detector 35 includes triode vacuum tubes 65 and 66 interconnected in a manner similar to tubes 63 and 64. The plates of tubes 63, 64, 65 and 66 are supplied with equal positive potential from point 67, through plate resistances 68. The control grid of tube 63 is connected to the output of delay circuit 48 through condenser 70, and to ground through resistance 71, while the output of detector 35 is fed to the control grid of tube 65 by way of condenser 72, with the latter grid connected to ground through resistance 73. Differential amplifier 50 comprises triode vacuum tubes 74 and 75 which function to balance the outputs of the multi-vibrators against each other, tube 76 which functions as an inverter and a discriminator circuit comprising vacuum tubes 77 and 78, each of which respectively control operation of output tubes 79 and 80.

Operation of delay circuit 48 and the channel of coincidence metering circuit 49 that is responsive to the output of the delay circuit is more fully understood with reference to the voltage curves shown in FIGS. 6 through 9. The negative rectangular pulse output of blanking circuit 31 is shown in FIG. 6, wherein the duration of the pulse, represented by broken lines $i$ and $j$ is equal to the unblocked interval of the receiver. The negative rectangular pulse shown in FIG. 6 is applied to the grid of tube 60, which is normally biased to pass current, to block the tube for an interval equal to the duration of the negative pulse. During the time tube 60 is blocked, condenser 62 receives a charge from point 67, through resistance 61, that varies as a substantially linear function with time, as shown in FIG. 7. Tube 63 of the multi-vibrator is normally blocked by a sufficient positive bias on the cathode thereof, while tube 64 therefore normally passes current. Since the high potential terminal of condenser 62 is connected to the grid of tube 63, through condenser 70, the tube is rendered conducting when the charge on the condenser reaches a value corresponding to the cut-off potential of the tube. The bias on the cathode of tube 63 is adjusted in such a manner that the charge on condenser 62 is equal to the cut-off potential of tube 63 at the middle of the interval $i$–$j$, shown by broken line $k$ in FIGS. 7, 8 and 9. The voltage on the grid of tube 63 is shown in FIG. 8, wherein the grid voltage increases as substantially linear function of time during the time interval $i$–$k$ and abruptly increases at $k$, the instant tube 63 is biased conducting. The grid voltage remains at the increased value throughout the interval $k$–$j$, and then abruptly decreases to another value, above the cut-off potential of tube 63, since tube 60 is rendered conducting at the instant the negative rectangular pulse shown in FIG. 6 terminates. The grid voltage is maintained at the latter value, for a predetermined period of time, following instant $j$, determined by the values of condenser 70 and resistance 71, and thereafter drops below the cut-off potential to block the tube. At the instant $k$ tube 63 is rendered conducting, negative potential is transferred to the grid of tube 64 to block the latter tube, and, due to the action of the multi-vibrator circuit, tube 64 is maintained blocked for a period of time equal to the interval during which tube 63 passes current, thus generating a positive rectangular pulse at the plate of tube 64 as shown in FIG. 9. The plate of tube 64 is connected to the grid of tube 74 through condenser 81, while the grid is connected to ground by way of resistance 82. The values of condenser 81 and resistance 82 are selected so that the bias on the grid of tube 74 varies, in a manner shown in FIG. 10, in response to the positive rectangular pulse from tube 64. Operation of the other channel of coincidence metering circuit 49 is more readily explained with reference to FIGS. 11 and 12 wherein the reflected energy pulse from detector 35 as well as the output of the multi-vibrator circuit comprising the latter channel are respectively shown in the same time relation as the voltage curves illustrated in FIGS. 6 through 10 inclusive, and wherein interval $i$–$j$ represents the unblocked interval of receiver 30 and instant $k$ the intermediate instant of the unblocked interval. In FIG. 11, reflected energy signal $l$ is shown received at instant $m$ during interval $k$–$j$ of unblocked interval $i$–$j$, while the voltage output of tube 64 of the multi-vibrator circuit is shown in FIG. 12. Reflected energy signal $l'$ is shown of a duration substantially less than the duration of interval $i$–$j$ for purposes of clarity, and it is to be expressly understood that in actual operation interval $i$–$j$ is to be of substantially the same order of duration as received pulses in order to prevent reception of noise signals and pulses reflected from other remote objects. Tube 65 is normally blocked by a positive bias on the cathode thereof, while tube 66 normally passes current since the grid thereof is normally biased beyond cut-off due to the connection to the plate of tube 65. The received positive impulse $l$ is applied to the grid of tube 65, through condenser 72, to abruptly render the latter tube conducting and, due to the action of the multi-vibrator circuit, to block tube 66 abruptly. The values of condenser 72 and resistance 73 are selected so that a positive bias is maintained on the grid of tube 65 for a period of time equal to the duration of the pulses produced at the output of tube 64, and then diminishes to return the multi-vibrator circuit abruptly to the normal state thereof. With the foregoing arrangement, a negative rectangular pulse appears at the output of tube 65 whenever a positive received pulse is applied from detector 35, with the rectangular pulse initiating at substantially the same instant the reflected pulse is applied and with the rectangular pulse having a duration equal to the duration of the positive pulse output of tube 64. The output of tube 65 is shown in FIG. 12, wherein the rectangular negative pulse initiates at instant $m$, the instant pulse $l$ is received. Furthermore, with reference to FIGS. 9 and 12, it is to be noted that the output of the multi-vibrator circuits in each channel of coincidence metering circuit 49 are of equal amplitude, of the same duration, with 180° phase difference therebetween. The output of tube 65 is passed through condenser 83 to the grid of tube 75, while the grid of the latter tube is also connected to ground through resistance 84. The voltage wave form shown by the full lines in FIG. 13 therefore appears on the grid of tube 75 whenever a positive pulse is applied to the input of tube 65.

As aforementioned, tubes 74 and 75 are included in differential amplifier 50 and function to balance the symmertical outputs of coincidence metering circuit 49 against each other in time. Tube 74 is normally blocked by a positive bias on the cathode thereof and is responsive to the voltage shown in FIG. 10, while tube 75 is normally biased to pass current and is responsive to voltage shown by the full lines of FIG. 13. The plates of tubes 74 and 75 are connected togethr at point 85 and are supplied with equal potential through resistance 86. When tubes 74 and 75 are in the aforesaid normal states thereof, a potential, equal to the plate potential of the tubes, appears at point 85. However, when the voltage shown in FIG. 10 is applied to the grid of tube 74, with tube 75 passing current, tube 74 is abruptly rendered conducting and a drop in potential appears at point 85. Point 85 remains at such low poential value until tube 75 is blocked upon application of the voltage shown in FIG. 13 to the grid thereof. In FIG. 13 the voltage applied to the grid of tube 74 is shown in broken lines, in a certain time relation with the voltage applied to the grid of tube 75. From this figure it can be readily seen that tube 74 is rendered conducting prior to the time tube 75 is blocked, and a negative pulse, as shown in FIG. 14, appears at point 85. Since an abrupt positive increase in potential is applied to the grid of tube 74 at the intermediate instant $k$ of unblocked interval $i$–$j$, whenever receiver 30 is unblocked, a negative pulse appears at point 85 whenever the reflected signal is received during interval $k$–$j$. As will appear more fully hereinafter, whenever tube 75 is blocked, with tube 74 in a blocked state, an increase in potential appears at point 85 until tube 74 is rendered conducting. The latter condition occurs whenever the reflected signal is received during interval $i$–$k$ of the unblocked interval $i$–$j$.

As previously stated, differential amplifier 50 also includes a discriminating circuit comprising vacuum tubes 77 and 78. Tubes 77 and 78 are of the triode type each having a plate, a cathode and a control grid. The plates of the tubes are supplied with equal positive potential, the cathodes are respectively connected through high value resistances 87 and 88 to ground, while the control grids are connected together at ground through resistances 89 and 90 respectively. The control grid of tube 77 is connected to point 85 through condenser 91, while the grid of tube 78 is also connected to point 85 through condenser 92 and tube 76. Tubes 77 and 78 are normally biased below cut-off and are rendered conducting upon application of a positive bias to the control grids thereof. Whenever the potential of point 85 increases positively, a positive impulse is transferred through condenser 91 to the control grid of tube 77 to drive the latter tube conducting. When the potential of point 85 becomes more negative, as shown in FIG. 14, tube 77 is not effected thereby since the grid thereof is normally negatively biased; however, a negative impulse is applied to the control grid of tube 76 to transfer the latter from a normally conducting state to a blocked condition. When tube 76 is blocked, a positive pulse is applied to the control grid of tube 78, through condenser 92, to render the latter tube conducting. The cathode of tubes 79 and 80 are fed to phase control 32 for controlgrids of tubes 79 and 80, respectively, which comprise the output tubes of differential amplifier 50. Tubes 79 and 80 are normally blocked by a positive bias on the cathodes thereof and are rendered conducting whenever tubes 77 or 78 are passing current. The outputs of tubes 79 and 80 are fed to phase control 32 for controlling the direction of phase variation. As shown in FIG. 5 of the drawings, phase control 32 comprises phase varying device 100 such as a goniometer, and dual motor 101 operatively connected to phase varying device 100. Device 100 has connections with main control oscillator 13, range keeper 51, sweep circuit 54 and blanking circuit 31 and includes indicator 102, calibrated in range, for indicating range as a function of phase. Motor 101 includes a pair of field windings, not shown, one of which is connected to points 103 and 104 in series with the plate of the tube 79 and the high positive potential applied at point 105, while the other field winding is connected to points 104 and 106, in series between the potential source at point 105 and the plate of tube 80. When tube 79 passes current, the field of motor 101 connected to points 103 and 104 is energized to rotate the motor in a certain direction, while current passes through the field connected across points 104 and 106 when the tube 80 is conducting to rotate motor 101 in the other direction. The values of resistance 87 and condenser 200 associated with the grid of tube 79, and the values of resistance 88 and condenser 201 connected to the grid of tube 80, are selected so that the tubes are maintained biased above cut-off for a predetermined period of time following application of a positive impulse thereto. The foregoing period of time is selected so that the cathodes of tubes 77 and 78 are maintained at a certain positive potential, above the cut-off potentials of tubes 79 and 80, for the period between applied positive pulses, as shown in FIG. 15, wherein the voltage appearing in the cathode of tube 78 in response to application of the negative pulses shown in FIG. 14 at point 85 are disclosed. Since the cathodes of tubes 77 and 78 are maintained at a potential above the cut-off potentials of tubes 79 and 80 whenever tube 77 or 78 are passing current, tube 80 produces a constant current output, as shown in FIG. 16, upon application of the voltage shown in FIG. 15 to the grid thereof. The constant current output shown in FIG. 16 flows through the field winding of motor 101 connected across points 104 and 106 to rotate the motor in the proper direction to operate phase varying device 100 in such a manner as to cause receiver 30 to be unblocked at the proper time with respect to the transmitted pulses so that reflected energy pulses are received at intermediate instant $k$ of the unblocked interval $i$–$j$.

Whenever the reflected energy pulse $l$ is received during the interval $k$–$j$, of unblocked interval $i$–$j$, the output of tube 64, shown in FIG. 9, leads the output of tube 65 shown in FIG. 12, to render tube 74 conducting prior to the time tube 75 is blocked, thus producing a negative pulse at point 85 whenever a reflected energy pulse is received, as shown in FIG. 14. The negative pulses operate tubes 78 and 80, in a manner discussed heretofore, to apply a constant current through a field winding of motor 101, thus rotating phase varying device 100 in a certain direction. Device 100 is rotated in the proper direction to increase the phase difference between the output of main control oscillator 13 and the input of blanking circuit 31 thus unblocking receiver 30 at a later time with respect to the time pulses are transmitted. When the time that the receiver is unblocked is varied so that reflected pulse $l$ is received at intermediate instant $k$ of the unblocked interval $i$–$j$, the outputs of tubes 64 and 65 are applied in phase to the grids of tubes 74 and 75 and no potential variation appears at point 85. Tube 78 is then abruptly blocked and the current flow through the winding of motor 101 connected across points 104 and 106 ceases. When the reflected energy pulses are received during the interval i–k, of the unblocked interval i–j, at instant n for example, as shown in FIG. 17, the output of tube 65, shown in FIG. 18, leads the output of tube 64. With reference to FIG. 19, wherein the voltages applied to the grids of tubes 74 and 75 are shown in the same time relation, it can be seen that tube 75 is blocked prior to the instant tube 74 is rendered conducting and a positive pulse appears at point 85, as shown in FIG. 20, whenever a reflected energy pulse is received. Such positive pulses are applied to the grid of tube 77 to maintain the latter tube continuously conducting to produce a voltage at the cathode thereof in accordance with the voltage curves of FIG. 21. The voltage shown in FIG. 21 is applied to the control grid of tube 79 to maintain the latter tube conducting and to provide a constant current flow through the field winding of motor 101 connected across points 103 and 104, as shown in FIG. 22. Motor 101 operates phase varying device 100 to decrease the phase angle of the timing wave from main control oscillator 13 thus decreasing the time receiver 30 is unblocked with respect to the time pulses are transmitted. The time receiver 30 is unblocked is decreased at a constant rate until the reflected energy pulse is received at the intermediate instant k of the unblocked interval i–j, in which case the output of the multivibrator circuits coincide, as shown in FIGS. 23, 24 and 25, and no current flows through the field windings of motor 101.

With an arrangement having the foregoing characteristics, the range of a moving remote object, such as an aircraft for example, as well as the rate of change of range of such object, are automatically continually indicated with an extremely high degree of accuracy. Since the system automatically maintains receiver 30 unblocked for interval i–j, in the proper time with respect to transmitted pulses, so that reflected energy is received at intermediate instant k of unblocked interval i–j, and furthermore, since instant k is of extremely short duration with respect to time of interval i–j, the range indications are of an extremely high degree of accuracy. Moreover, the system is designed in such a manner that the unblocked interval i–j of receiver 30 is rapidly varied in time whenever range of the remote object changes to maintain the above-mentioned relationship with respect to the received reflected energy, and therefore extremely accurate indications of the rate of change of range of the remote object is obtained at range keeper 51.

As mentioned heretofore, the present invention provides means for blocking reception of noise signals as well as energy reflected from remote objects other than the preselected remote object, thus effectively eliminating the harmful effects resulting from reception of such signals. By adjusting the constants of blanking circuit 31 so that the unblocked interval i–j of receiver 30 is of substantially the same order of duration as the received reflected energy pulses, it is to be expressly understood that noise signals, as well as energy pulses reflected from other objects, are not passed through receiver 30 to the other circuits of the system. Effective blocking of noise signals and undesired energy reflections allows the automatic range follow-up systems, the automatic bearing follow-up systems, as well as the indicating devices associated therewith, to operate at high degrees of efficiency to accurately determine and indicate range and direction of the preselected remote object, and to rapidly respond to range and bearing variations of the remote object.

Another system for automatically providing continuous range indications of a moving object with a high degree of accuracy is shown in FIG. 26. This arrangement includes blanking circuit 31, phase control 32, coincidence metering circuit 49, differential amplifier 50 and sweep circuit 54 shown in FIG. 1 interconnected in a similar manner. The output of detector 35 is simultaneously fed to the vertical deflection plates of oscillograph 52 and to coincidence metering circuit 49, while sweep circuit 54 produces a horizontal sweep of the electron beam of the oscillograph during the time receiver 30 is unblocked, in a manner fully described heretofore. This arrangement further includes metallic wire 108 mounted within oscillograph 52 in a vertical plane passing through the center thereof in such a manner that the electron beam impinges on wire 108 at the intermediate instant of each sweep thereof. Whenever the electron beam impinges upon wire 108 an electrical impulse is applied to wire 108 that is passed to amplifier 109 wherein the impulse is suitably amplified. The pulse output of amplifier 109 always appears at the intermediate instant k of the unblocked interval i–j, as shown in FIGS. 6 through 25, since sweep circuit 54 is synchronized with blanking circuit 31 so that the sweep of the electron beam corresponds, in time, to the unblocked interval i–j of receiver 30. The output of amplifier 109 is fed to the channel of coincidence metering circuit 49 which comprises tubes 63 and 64 so that tube 64 produces a positive rectangular pulse, which initiates at the intermediate instant k, upon application of each impulse from amplifier 109, as shown in FIG. 9. Coincidence metering circuit 49 and differential amplifier 50 function in a manner fully described heretofore to automatically operate phase control 32 from which accurate range indications are obtained. With the foregoing arrangement an automatic range follow-up system is provided wherein a small number of comparatively simple circuits and elements are employed and extremely accurate range indications are obtained therefrom.

A further embodiment of the invention is illustrated in FIG. 27 of the drawings. This embodiment includes novel means for automatically continually following a remote object, notwithstanding movement of the object in a horizontal or vertical plane, and means for continually indicating azimuth and elevation of such remote objects with a high degree of accuracy. The apparatus disclosed in FIG. 27 employs certain of the elements of the system shown in FIG. 1 which are designated by corresponding reference numerals, and is designed in such a manner as to operate in connection with the novel automatic range follow-up system described heretofore so that accurate range, and rate of change of range, of the remote object are also obtained. Means are provided in this embodiment for producing a pair of juxtapositioned directional energy beams, polarized in a horizontal plane, with other means responsive to reflected energy from each of the beams to automatically continually maintain the beams equally distant from the remote object from which the energy reflected, in a manner similar to the arrangement shown in FIG. 1, as well as other means for producing a second pair of juxtapositioned directional energy beams polarized in a vertical plane, and means responsive to reflected energy from the vertical beams for automatically continually maintaining the latter beams equally-distant from the remote object from which the energy reflected. By maintaining the horizontal and vertical juxtapositioned beams in the proper relationship, the beams are automatically continually adjusted so that all of the beams are maintained equally-distant from a single remote object, regardless of azimuth and/or elevation variations of such object.

More particularly, as shown in FIG. 27, the apparatus includes directional beam antennae 110 and 111 constructed in a manner similar to antenna 17, for example, or of any other suitable construction whereby highly directional energy beams are emitted therefrom. Antenna 110 is mounted for vertical and horizontal movement by means of shafts 112 and 113, respectively, and is horizontally polarized, while antenna 111 is vertically polarized and is mounted for vertical and horizontal movement about shafts 114 and 115, respectively. The equally spaced radio pulses at frequencies $F+f$ and $F-f$ from power amplifier 15 are passed through a channel of duplexing circuit 16, and through switching circuit 116 to antennae 110 and 111. Each of the antennae is fed through a transmission line 18, constructed in accordance with the transmission line shown in FIG. 3, so that a pair of juxtapositioned directional energy beams, at frequencies $F+f$ and $F-f$, are emitted from antennae 110 and 111 in a manner fully described heretofore. Since antenna 110 is horizontally polarized, the juxtapositioned energy beams emitted therefrom are disposed at equal angles on opposite sides of the normal axis of antenna 110 in a horizontal plane. Also, since antenna 111 is vertically polarized, the directional energy beams emitted therefrom are in a vertical plane and are disposed at equal angles on opposite sides of the normal axis of antenna 111. Antennae 110 and 111 are mounted adjacent each other, and, as will appear more fully hereinafter, are synchronously moved so that the normal axes thereof are at all times directed toward a substantially common point. Switching circuit 116 operates in accordance with the timing wave from main control oscillator 13, and is constructed in such a manner that the pair of radio pulses, that is, simultaneously generated radio pulses at frequencies $F+f$ and $F-f$, are alternately fed to antennae 110 and 111, and that a connection is maintained between one of the antennae and duplexing circuit 16 whenever a pair of pulses is fed to the antenna, for a period of time equal to the time interval between generation of pairs of pulses. More particularly, when a first pair of pulses is generated, switching circuit 116 forms a connection between duplexing circuit 16 and antenna 110, for example, to which the first pair of pulses is fed. The above connection is maintained until the second pair of pulses is generated, at which instant switching circuit 116 operates to terminate the connection to antenna 110 and to form a connection between duplexing circuit 16 and antenna 111, from which the second pair of pulses is emitted. Upon generation of the third pair of pulses switching circuit 116 functions to break the connection to antenna 111 and to again form the connection with antenna 110. With the foregoing arrangement, radio pulses at frequencies $F+f$ and $F-f$ are alternately fed to antennae 110 and 111 and individual connections are maintained between duplexing circuit 16 and the antennae so that reflections of transmitted energy are received at the antenna from which the energy was emitted. Mechanical and electronic switching circuits embodying principles well known in the art adequately serve the purpose of switching circuit 116.

Energy reflected from a remote object is received at antennae 110 and 111, passed through switching circuit 116 and duplexing circuit 16 to receiver 30. Whenever receiver 30 is unblocked, upon application of an impulse from blanking circuit 31, reflected energy received during the unblocked interval is passed to detectors 33, 34 and 35. As in the previous embodiment, the output of detectors 33 and 34 are fed to differential amplifier 36 wherein the difference in power between the simultaneously received reflected energy at frequencies $F+f$ and $F-f$ is determined. Since radio pulses are alternately fed to antennae 110 and 111, and furthermore, since antenna 110 is horizontally polarized and antenna 111 is vertically polarized, the difference in power between simultaneously received reflected energy at frequencies $F+f$ and $F-f$ alternately portray the position of the remote object from which the energy reflected, with respect to the horizontally polarized beams emitted from antenna 110 and the vertically polarized beams emitted from antenna 111. In order to control the vertical and horizontal adjustments of antennae 110 and 111 in accordance with the output of differential amplifier 36 in such a manner that the directional energy beams emitted from antennae 110 and 111 are continually maintained equally distant from the remote object, means are provided for alternately applying the outputs of differential amplifier 36 to a pair of channels, one of which controls movements of the antennae in a horizontal plane while the other channel controls the vertical positions of the antennae. As shown, the foregoing means comprises switching circuit 117, constructed in a manner similar to switching circuit 116 and which operates in synchronism therewith in accordance with the output of main control oscillator 13, for alternately feeding the output of differential amplifier 36 to directional control mechanisms 118 and 119, both of which are similar to directional control mechanism 37 shown in FIG. 1. The output of directional control mechanism 118 is applied to motors 120 and 121 which respectively rotate antennae 110 and 111 in a vertical plane through shafts 112 and 114, while directional control mechanism 119 is electrically connected to motors 122 and 123, which respectively rotate antennae 110 and 111 in a horizontal plane, through shafts 113 and 115, in accordance with the output of directional control mechanism 119. Switching circuit 117 operates in synchronism with switching circuit 116 in such a manner that the output of differential amplifier 36 is fed to directional control mechanism 118 whenever duplexing circuit 16 is connected to antenna 111, while the output of differential amplifier 36 is passed to directional control mechanism 119 at all times when the duplexing circuit is connected to antenna 110.

In order to determine whether or not the normal axes of antennae 110 and 111 are pointing directly toward a remote object means are provided for indicating the exact position of the remote object with respect to the juxtapositioned directional energy beams emitted from each of the antennae. Such means comprises oscillographs 124 and 125, each of which include a pair of horizontal and vertical deflection plates, intensity control grids 126 and 127, respectively, and means for generating an electron beam, not shown. The output of detector 35 is passed to the vertical deflection plates of oscillographs 124 and 125, and to intensity control grids 126 and 127. The horizontal deflection plates of oscillograph 124 are connected across the input to directional control mechanism 119, while the input to directional control mechanism 118 is applied to the horizontal deflection plates of oscillograph 125. Whenever the normal axes of antennae 110 and 111 are pointing directly toward a remot object, equal energy is applied to differential amplifier 36, no energy is applied to directional control mechanisms 118 and 118, and consequently no potential difference appears between the horizontal deflection plates of oscillographs 124 and 125. With the foregoing conditions, a vertical trace appears on the screen of each of the oscillographs, thus indicating that the directional energy beams emitted from the antennae are equally distant from the remote object. However, whenever unequal energy pulses at frequencies $F+f$ and $F-f$ are applied to differential amplifier 36, energy, having characteristics determined by the difference in power of the energy pulses applied to differential amplifier 36 is fed to directional control mechanisms 118 and 119. A certain potential therefore alternately appears between the horizontal deflection plates of oscillographs 124 and 125 to deflect the vertical trace in accordance therewith, in a manner discussed heretofore relative to oscillograph 45 of FIG. 1. Since the horizontal deflection plates of oscillograph 124 are connected to the input of directional control mechanism 119, the indication produced on the screen of the latter oscillograph shows the position of the remote object with respect to the juxtapositioned directional energy beams emitted from antenna 110, while the position of the remote object with respect to the juxtapositioned directional energy beams emitted from antenna 111 is shown by the indication produced on the screen of oscillograph 125, in response to the input to directional control mechanism 118 that is applied to the horizontal deflection plates of the latter oscillograph. The azimuth angle of the remote object that is maintained equally distant from the directional energy beams is obtained from azimuth indicator 41 which functions in accordance with horizontal rotation of antenna 110 in a manner similar to the arrangement described heretofore, while elevation indicator 128, that is responsive to movement of antenna 110 in the vertical plane, provides means for accurately indicating the elevation of the remote object.

With an apparatus of the foregoing type the position of a remote object in space, such as an aircraft, is automatically continually obtained with a high degree of accuracy regardless of the direction of movement of the object with respect to the apparatus. The apparatus also provides means for automatically continually training other devices, such as guns 42 directly toward such remote object, likewise with high degrees of accuracy and reliability. Although antennae 110 and 111 are shown independently mounted with the positions thereof controlled through individual motors, it is to be expressly understood that the antennae may be mounted on a single support and single horizontal and vertical control motors employed for controlling movements thereof.

Still another embodiment of the invention is shown in FIG. 28 of the drawings. This embodiment includes the principles disclosed in the application of Robert M. Page, Serial No. 452,535, filed July 27, 1942, now Patent No. 2,628,350, for Range and Direction Finder, the novel means heretofore described for automatically continually determining and indicating range, and the rate of change of range, of a moving remote object as well as other novel means for automatically continually adjusting the position of an antenna in such a manner that the normal axis thereof continually points toward the remote object. This system is so characterized, by utilizing a single antenna of light-weight compact construction, that movements of a specific remote object are rapidly followed with a high degree of accuracy.

As shown, the single antenna, designated generally at 130, comprises antenna members 131, 132 and 133, disposed 120° with respect to each other on a parabolic reflector 134 at equal distances from the focal point thereof. Parabolic reflector 134 is rotatably mounted on support 135 by means of shafts 136, 136 while support 135 is rotatably mounted at right angles to shafts 136, 136 by means of shaft 137 and suitable bearing means, not shown. In accordance with the principles disclosed in the above mentioned application for Range and Direction Finder, means are provided for producing a conically rotating directional energy emission from antenna 130, means for producing a beam from antenna 130 sensitive to reception of the emitted energy which rotates in synchronism with rotation of the directional energy emission and means responsive to reception of energy reflected from a remote object enclosed by the conically rotating directional energy beam for producing an indication on the screen of a cathode ray oscillograph which shows the position of the remote object with respect to the circular path followed by the conically rotating beams. The foregoing means comprises radio frequency oscillator 138, operation of which is controlled by electronic keyer 12 in accordance with the timing wave from main control oscillator 13 in such a manner that equally spaced radio frequency pulses are produced therefrom. The output of oscillator 138 is passed to radio frequency amplifiers 139, 140 and 141, each of which are connected, through individual channels of duplexing circuit 142, to antenna members 131, 132 and 133, respectively. The amplitudes of the radio frequency pulses simultaneously applied to amplifiers 139, 140 and 141 are varied respectively in accordance with the outputs of modulator circuits 143, 144 and 145. Each of modulator circuits 143, 144 and 145 are supplied with a sinusoidal varying voltage from three-phase supply 146, with the voltage applied to each modulator circuit being 120° out of phase with respect to the phase of the voltages applied to the other modulator circuits. The amplitudes of the radio frequency pulses at the outputs of amplifiers 139, 140 and 141 are thus sinusoidally modulated, with the amplitudes of the radio frequency pulses at each amplifier sinusoidally varying 120° out of phase with respect to the phase of the sinusoidally varying amplitudes of radio frequency pulses at the other amplifiers. When the above outputs of amplifiers 139, 140 and 141 are fed to antenna elements 131, 132 and 133, a single directional energy beam is emitted from antenna 130 which conically rotates symmetrically about an axis normal to parabolic reflector 134, that passes through the focal point of the reflector, at a frequency determined by the frequency of three-phase supply 146. In order to produce a beam from antenna 130 that is sensitive to reception of energy emitted from the antenna and which rotates in synchronism with rotation of the directional energy beam, antenna elements 133, 132 and 131 are connected through the individual channels of duplexing circuit 142 to mixer circuits 147, 148 and 149, respectively, and each of the mixer circuits is supplied with sinusoidally varying voltage from three-phase supply 146 in phase with the sinusoidal voltage supplied to modulator circuits 145, 144 and 143, respectively.

Reflected energy received at antenna elements 131, 132 and 133 is passed to mixer circuits 147, 148 and 149 wherein the amplitudes of the reflected pulses are sinusoidally modulated. The output of high frequency oscillator 150 is passed to each of the mixer circuits wherein the reflected energy and the output of oscillator 150 are combined so that the mixer circuits produce energy pulses at an intermediate frequency, the amplitudes of which are sinusoidally modulated with 120° phase difference between the output of each mixer circuit. The outputs of mixer circuits 147, 148 and 149 are fed to intermediate frequency amplifier 151, through pulse detector 152 to pulse amplifier 153 wherein the pulses are suitably amplified. The output of pulse amplifier 153 is simultaneously applied to modulator circuits 154, 155 and 156, each of which is supplied with sinusoidally varying voltage from three-phase supply 146 in phase with the sinusoidal voltage applied to mixer circuits 147, 148 and 149, respectively. Modulator circuits 154, 155 and 156 are designed in such a manner that the sinusoidally varying voltage applied to each of the modulator circuits is effectively blocked from the outputs thereof, and the output of each of modulator circuits 154, 155 and 156 therefore comprises only radio frequency pulses having sinusoidally varying amplitudes. The outputs of modulator circuits 154, 155 and 156 are fed to the deflection plates of three-phase cathode ray oscillograph 160. More particularly, oscillograph 160 includes deflection plates 161, 162 and 163 positioned 120° with respect to each other about the central axis of the oscillograph, and the output of modulator circuits 154, 155 and 156 respectively connected to deflection plates 161, 162 and 163. Whenever energy pulses are simultaneously applied to deflection plates 161, 162 and 163 the electron beam of the oscillograph is radially swept in a direction determined by the relative strength of the energy applied to each deflection plate, shown by radial sweep lines p. Since antenna members 131, 132 and 133 are positioned about the focal point of parabolic reflector 134 respectively in the same manner that deflection plates 163, 162 and 161 are positioned about the central axis of oscillograph 160, and furthermore, since the circuits associated with correspondingly positioned antenna members and deflection plates are supplied with sinusoidal voltage of the same phase, the voltage applied to deflection plates 161, 162 and 163 are at all times directly proportional to the reflected energy induced in antenna members 133, 132 and 131, respectively. When reflected energy of equal power is induced in antenna members 131, 132 and 133, energy pulses, having equal sinusoidal varying amplitudes are applied to deflection plates 161, 162 and 163, with 120° phase difference between the amplitudes of the energy applied to each plate. Due to the three-phase sinusoidal varying amplitudes, the radial sweep of the electron beam rotates, following a complete revolution for each period of the three-phase supply, developing circle *q* that is equally distant from the central axis of the oscillograph. In other words, the radial sweep line *p* rotates in synchronism with the conically rotating directional energy beam and the beam sensitive to reception of transmitted energy. Since reflected energy of equal power is induced in antenna members 131, 132 and 133 when the conically rotating beam describes a circle equally distant from a remote object, the concentric position of circle *q*, with respect to the central axis of the oscillograph, corresponds to the path of the beam about the remote object. When the conically rotating beam follows a path unequally distant from a remote object, energy of unequal power is induced in antenna members 131, 132 and 133 and energy pulses having unequal sinusoidal varying amplitudes are applied to deflection plates 161, 162 and 163. When unequal sinusoidally varying voltages are applied to the deflection plates, the rotating radial sweep of the electron beam describes a circle that is asymmetrical with respect to the central axis of the oscillograph, with the asymmetrical position of the developed circle on the oscillograph screen corresponding to the position of the circular path of the conically rotating beams about the remote object.

As previously mentioned, the apparatus disclosed in FIG. 28 also includes the novel automatic range follow-up system described heretofore, whereby continuous indications of range, and the rate of change of range of a remote object are automatically obtained with a high degree of accuracy. As shown, the timing wave from main control oscillator 13 is fed through phase control 32 to blanking circuit 31, range keeper 51 and sweep circuit 54. Blanking circuit 31 functions to apply a negative impulse to mixer circuits 147, 148 and 149, through conductor 165, to unblock the mixer circuits for a short period of time whenever a radio frequency pulse is generated by oscillator 138. As previously described, the output of blanking circuit 31 is also passed through delay circuit 48 to coincidence metering circuit 49, while the output of pulse amplifier 153 is also passed to the coincidence metering circuit. The output of coincidence metering circuit 49 is applied to differential amplifier 50 wherein the reference signal from delay circuit 48 and the received reflected energy signal are balanced against each other in time. The output of differential amplifier 50 automatically operates phase control 32 so that reflected energy is continually received at the intermediate instant of the unblocked interval of mixer circuits 147, 148 and 149. The output of pulse amplifier 153 is also fed to the vertical deflection plates of oscillograph 52, by way of conductor 166, whereon the accuracy of the range indications are observed. Operation of the foregoing arrangement has been fully described heretofore and further discussion thereof is believed unnecessary.

In order to automatically continually maintain the circular path developed by the conically rotating beams of antenna 130 equally distant from a remote object, so that the axis normal to reflector 134 that passes through the focal point of the reflector, is, at all times, pointing directly toward the remote object, means are provided for automatically adjusting the position of antenna 130, in a pair of planes at right angles to each other, in accordance with asymmetrical positions of the remote object with respect to the circular path of the beams. The foregoing means comprises differential amplifiers 170 and 171 and directional control mechanisms 172 and 173, constructed in a manner similar to differential amplifier 36 and directional control mechanism 37 described heretofore relative to the apparatus disclosed in FIG. 1 of the drawings. The potentials applied to deflection plates 162 and 163 are fed to differential amplifier 170, while output signals from the latter are applied to directional control mechanism 172. The output of directional control mechanism 172 controls operation of vertical motor 174 mechanically connected, through shaft 175, to shaft 136, to rotate parabolic reflector 134 in a vertical plane. Deflection plates 161 and 163 are connected to the input of differential amplifier 171, while the output signals from the latter operate directional control mechanism 173 is fed to horizontal motor 176 mechanically connected to shaft 137 to rotate parabolic reflector 134 in a plane at right angles to the plane of rotation about shafts 136, 136 in accordance with the output of directional control mechanism 173.

As mentioned heretofore, whenever the conically rotating beams from antenna 130 follow a circular path equally distant from a remote object, reflected pulse energy of equal power are continually received by the beam, and therefore equal average voltages appear on deflection plates 161, 162 and 163. Under the foregoing conditions, therefore, equal voltages are applied to differential amplifiers 170 and 171 and no output signal is applied to directional control mechanism 172 and 173, and motors 174 and 175 are not operated. However, whenever the position of antenna 130 is such that the conically rotating beams follow a circular path equally distant from a remote object, reflected pulse energy of varying power is received by the sensitive beam as the latter rotates and unequal average potentials appear at deflection plates 161, 162 and 163. When a potential difference exists between the voltages applied to deflection plates 162 and 163 differential amplifier 170 produces an output having certain characteristics determined by the power of the voltages appearing on the deflection plates. Such output of differential amplifier 170 operates directional control mechanism 172 so that the latter supplies the proper energy to rotate motor 174 in the correct direction to vary the position of parabolic reflector 134 in a vertical plane in such a manner that the average voltages appearing on deflection plates 162 and 163 are changed to equal values. Also, when a potential difference exists between deflection plates 161 and 163 differential amplifier 171 produces a certain output, which operates motor 176, through directional control mechanism 173, to vary the position of parabolic reflector 134 in a horizontal plane in such a manner to equalize the average voltages appearing at deflection plates 161 and 163. By maintaining the voltages at deflection plates 162 and 163, and at deflection plates 161 and 163, at equal potential, no potential difference appears between deflection plates 161 and 162 and the conically rotating beams from antenna 130 therefore automatically continually follow a circular path equally distant from the remote object from which the energy reflected.

With the foregoing arrangement, movements of a remote object, in a horizontal or vertical plane, are rapidly, automatically continually followed with a high degree of accuracy since a single, light-weight antenna is employed. By connecting suitable elevation and azimuth indicators to shafts 136 and 137, respectively, the elevation and azimuth angle of the remote object followed are automatically continually indicated, while the outputs of directional control mechanisms 172 and 173 may be utilized for automatically continually training other elements directly toward the remote object, such as guns 42 as shown, in a manner described heretofore. The foregoing arrangement also automatically continually provides accurate indications of the range, and the rate of change of range, of the remote object followed by antenna 130, as well as oscillographs 52 and 160 whereon indications are produced which respectively show the accuracy of the range and directional indications obtained.

The novel automatic range follow-up system provided by the present invention is so characterized that automatic range searching is provided thereby, that is, the time receiver 30 is unblocked is automatically continually varied, with respect to the time a pair of pulses are generated, until energy reflected from a remote object is received, in which case the system thereafter operates in a manner described heretofore to continually indicate range of such remote object. More particularly, as described heretofore with reference to FIGS. 6 through 10, whenever a pair of pulses are generated the timing wave from main control oscillator 13 operates blanking circuit 31 so that receiver 30 is unblocked during the interval *i–j*, and an abrupt positive potential, shown in FIG. 10, is applied to the grid of tube 74 at the intermediate instant *k* of unblocked interval *i–j*, to unblock the tube and thus produce a drop in potential at point 85 since tube 75 normally passes current. It is to be expressly understood, therefore, when no reflected energy is received during the unblocked interval *i–j*, a drop in potential appears at point 85 to maintain tubes 78 and 80 in a conducting state, thus subsequently causing motor 101 to rotate in the proper direction to continually increase the phase angle of the timing wave from main control oscillator 13, thus continually increasing the time receiver 30 is unblocked with respect to the time pulses are generated. Until reflected energy is received the phase angle of the timing wave from oscillator 13 is continually increased until the phase of the timing wave is varied through 360 electrical degrees, at which instant receiver 30 is unblocked at the maximum time interval following generation of a pair of pulses, or the receiver is unblocked at the proper time to receive energy reflected from a remote object at the maximum range of the apparatus. If no reflected energy is received after the phase of the timing wave is varied through 360 electrical degrees, phase control 32 automatically operates to vary the phase of the timing wave through another 360 electrical degrees, or, until reflected energy is received. The novel automatic range follow-up system disclosed herein may therefore be operated in such a manner to automatically indicate the range and bearing of the remote object most adjacent to the apparatus and to automatically follow such object notwithstanding range and bearing variations thereof. It is to be understood, however, that the apparatus may be operated so that remote objects at a predetermined range are automatically followed, or so that range and bearing of a preselected remote object are continually obtained.

There is thus provided by the present invention a novel method of and means for rapidly indicating bearing, or the azimuth angle, of a remote object in space with an extremely high degree of accuracy, as well as novel methods of and means for indicating elevation as well as the azimuth angle of a remote object in space with a corresponding degree of rapidity and accuracy. Furthermore, novel methods and means are provided herein for automatically training guns, or other movable devices such as telescopes or lights etc., in such a manner that such devices are continually directed toward a preselected remote object, regardless of movement of the object in any direction or at any rate of acceleration, with a high degree of accuracy and reliability. Moreover, the present invention provides novel methods and means for automatically continually indicating range, and the rate of change of range of a remote object, notwithstanding range variations of the object or the rate of such range variations. The foregoing methods and means are characterized in such a manner as to function simultaneously in a radio echo apparatus, as disclosed, whereby range, the rate of change of range, bearing and elevation of a remote object are continually indicated with high degrees of accuracy, and whereby such means may be employed for automatically continually training guns on the remote object and for automatically adjusting the range calibration of the guns in accordance with the range of the object. Furthermore, the automatic range follow-up system disclosed herein is designed in such a manner to eliminate reception of noise signals thus increasing the accuracy of the apparatus, while the foregoing system may be operated in such a manner to provide automatic range searching, as fully described heretofore.

Although several embodiments of the invention have been disclosed and described herein, it is to be expressly understood that various changes and substitutions may be made therein without departing from the spirit of the invention as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

What is claimed is:

1. The method of continually determining range of a remote object which comprises periodically transmitting energy toward the remote object, receiving reflected energy for an interval of substantially the same order of duration as said transmitted energy at a rate determined by a timing wave of the same frequency as the repetition rate of said transmitted energy, varying the phase of said timing wave for continually timing the reception to receive energy reflected from the remote object, indicating range of the remote object as a function of phase of said timing wave and indicating rate of change of range of said remote object as a function of the rate of change of phase of said timing wave.

2. The method of continually determining range and bearing of a remote object which comprises producing a pair of juxtapositioned directional energy beams, receiving reflected energy for an interval of substantially the same order of duration as said transmitted energy at the proper time to continually receive energy reflected from said remote object when impacted by said beams and maintaining said beams equally distant from said remote object.

3. The method of continually determining range and bearing of a remote object in space which comprises producing a pair of juxtapositioned directional intermittent energy waves, intermittently receiving reflected energy for an interval of substantially the same order of duration as said transmitted energy at a rate corresponding to the repetition rate of said energy waves, varying the time at which said reflected energy is received to continually receive energy of each of said beams reflected from said remote object when impacted by said beams and varying the bearing of said beams as a unit in response to reception of energy of different power to continually maintain said beams equally distant from said remote object.

4. The method of continually determining the position of a remote object in space with respect to a reference point which comprises producing a conically rotating directional energy beam from said point, directing said beam in such a manner as to follow a circular path about said object, receiving reflected energy for an interval of substantially the same order of duration as said transmitted energy at the proper time to continually receive energy reflected from the remote object and varying the direction of the beam in such a manner that the beam continually follows a circular path equally distant from said remote object.

5. The method of continually determining the position of a remote object in space which comprises producing a directional intermittent energy beam, rotating said beam in such a manner as to follow a circular path about said remote object, intermittently receiving reflected energy for an interval of substantially the same order of duration as said transmitted energy at a rate corresponding to the repetition rate of said energy beam, varying the time at which said reflected energy is received to continually receive energy reflected from said remote object and varying the direction of said beam in response to reception of reflected energy of varying power to continually maintain the circular path of said beam equally distant from said remote object.

6. The method of continually determining the position of a remote object in space with respect to a reference point which comprises producing two pairs of juxtapositioned intermittent directional energy beams with one of said pair in quadrature with respect to the other pair, intermittently receiving reflected energy for an interval of substantially the same order of duration as said transmitted energy at a rate corresponding to the repetition rate of said energy beams, varying the time at which said reflected energy is received to continually receive energy reflected from said remote object when impacted by said beams and varying the position of said beams in response to a difference in power between said received reflected energy to continually maintain said beams equally distant from said remote object.

7. The method of continually determining range and bearing of a remote object which comprises producing a pair of juxtapositioned directional energy beams with each beam comprising intermittent energy portions, intermittently receiving reflected energy for an interval of substantially the same order of duration as said energy portions at a rate determined by a timing wave of frequency equal to the repetition rate of said energy portions, adjusting the phase of said timing wave to continually receive energy of said beams reflected from a remote object impacted by said beams, determining the difference in power between the received reflected energy from said beams and varying the bearing of said beams as a unit in response to difference in power of said received energy of each of said beams to continually maintain said beams equally distant from said remote object.

8. An apparatus for continually determining range of a remote object comprising means intermittently transmitting energy toward the remote object, a receiver, means intermittently unblocking said receiver for a short time interval with respect to the time interval between transmitted energy at a rate detremined by a timing wave of the same frequency as the repetition rate of said transmitted energy, means automatically varying the phase of said timing wave for unblocking said receiver at the proper time to continually receive energy reflected from said remote object, means indicating range of said remote object as a function of phase of said timing wave and means indicating rate of change of range of said remote object as a function rate of change of phase of said timing wave.

9. In an apparatus for continually determining range of a remote object, means transmitting an energy wave comprising intermittent energy portions toward the remote object, a receiver, means intermittently unblocking said receiver for an interval of substantially the same order of duration as said energy portions in accordance with a timing wave of the same frequency as the repetition rate of said energy portions, means varying the phase of said timing wave for varying the time at which said receiver is unblocked, means responsive to a difference in time between unblocking of said receiver and reception of energy reflected from said remote object for automatically controlling the last-named means to unblock the receiver at the proper time whereby energy reflected from said remote object is continually received during said intervals.

10. In an apparatus for continually determining range a remote object, means intermittently transmitting energy toward the remote object, a receiver, means intermittently unblocking said receiver for an interval of substantially the same order of duration of said transmitted energy in accordance with a timing wave of the same frequency as the repetition rate of said transmitted energy, means producing a reference signal in accordance with said timing wave which originates at the intermediate instant of said intervals, means varying the phase of said timing wave and means responsive to a difference in phase between said reference signal and reception of energy reflected from said remote object for controlling the last-named means whereby said receiver is continually unblocked at the proper time to maintain said reference signal and received energy reflected from said remote object in the same phase.

11. In an apparatus for receiving a variable phase intermittent pulse energy wave, a receiver, means intermittently unblocking said receiver for an interval of substantially the same order of duration as said pulse energy at a rate determined by a timing wave of a frequency corresponding to the repetition rate of said pulse energy, means varying the phase of said timing wave and means responsive to a phase difference between said intervals and said pulse energy for operating the last-named means to continually unblock the receiver at the proper time to receive said pulse energy during said intervals.

12. In an apparatus for continually determining the azimuth angle and elevation angle of a remote object in space, means producing two pairs of juxtapositioned directional energy beams with one pair in space quadrature with respect to the other pair, means receiving energy of each of said beams reflected from a remote object impacted by said beams and means automatically varying the position of said beams in response to difference of power between said received reflected energy to continually maintain said beams equally distant from said remote object.

13. An apparatus for continually determining range and bearing of a remote object comprising a receiver, means producing a pair of juxtapositioned directional energy beams, means automatically unblocking said receiver at the proper time to continually receive energy reflected from a remote object impacted by said beams and means automatically maintaining said beams equally distant from said remote object.

14. In an apparatus for continually determining range and bearing of a remote object in space, a receiver, means producing a pair of juxtapositioned directional intermittent energy beams, means intermittently unblocking said receiver at a rate corresponding to the repetition rate of said energy beams, means automatically varying the time at which said receiver is unblocked to continually receive energy of each of said beams reflected from said remote object impacted by said beams and means automatically varying the bearing of said beams as a unit in response to reception of energy of different power to continually maintain said beams equally distant from said remote object.

15. An apparatus for continually determining the position of a remote object in space with respect to a reference point comprising a receiver, means producing a conically rotating directional energy beam from said point, means directing said beam in such a manner as to describe a circular path about said object, means automatically unblocking said receiver at the proper time to continually receive energy reflected from the remote object and means automatically varying the direction of said beam in such a manner that the beam continually follows a circular path equally distant from said remote object.

16. An apparatus for continually determining the position of a remote object in space with respect to a reference point comprising a receiver, means producing two pairs of juxtapositioned directional energy beams from said point with one of said pairs in quadrature with respect to the other pair, means automatically unblocking said receiver at the proper time to continually receive energy of each of said beams reflected from a remote object impacted by said beams and means automatically varying the position of said beams in response to a difference of power between said received energy to continually maintain said beams equally distant from said remote object.

17. In an apparatus for continually determining the position of a remote object in space, a receiver, means producing a directional intermittent energy beam, means rotating said beam in such a manner to follow a circular path about said remote object, means intermittently unblocking said receiver at a rate corresponding to the repetition rate of said energy beam, means automatically varying the time at which said receiver is unblocked to continually receive energy reflected from said remote object and means automatically varying the directing of said beam in response to reflected energy of varying power to continually maintain the circular path of said beam equally distant from said remote object.

18. In an apparatus for continually determining range and bearing of a remote object, a receiver, means producing a pair of juxtapositioned directional energy waves with each wave comprising intermittent energy portions, means intermittently unblocking said receiver for an interval substantially the same order of duration as said energy portions at a rate determined by a timing wave of a frequency equal to the repetition rate of said energy portions, means automatically adjusting the phase of said timing wave to continually unblock the receiver at the proper time to receive energy of said waves reflected from a remote object impacted by said waves, means determining the difference in power between the received reflected energy from said waves and means automatically varying the bearing of said waves as a unit in response to a difference in power of said received reflected energy of each of said waves to continually maintain said waves equally distant from said remote object.

19. In an apparatus for automatically determining range of a remote object, a receiver, means transmitting a directional energy wave comprising intermittent energy portions, means intermittently unblocking said receiver for an interval of substantially the same order of duration as said energy portions at a rate determined by a timing wave of a frequency equal to the repetition rate of said energy portions, means automatically increasing the phase of said timing wave until said receiver is unblocked at the proper time to receive energy reflected from a remote object impacted by said wave and thereafter automatically maintaining said receiver unblocked at the proper time to continually receive energy reflected from said remote object.

20. In an apparatus for automatically determining range of a remote object, a receiver, means transmitting a directional energy wave comprising intermittent energy portions, means intermittently unblocking said receiver for an interval of substantially the same order of duration as said energy portions at a rate determined by a timing wave of a frequency equal to the repetition rate of said energy portions, means automatically varying the phase of said timing wave until said receiver is unblocked at the proper time to receive energy reflected from a remote object impacted by said wave and means automatically varying the phase of said timing wave to continually unblock the receiver at the proper time to receive energy reflected from said remote object after energy reflected from said remote object is initially received.

21. An apparatus for continually determining range of a remote object comprising a receiver, means intermittently transmitting energy toward the remote object, means intermittently unblocking said receiver for a short time interval with respect to the time interval between transmitted energy at a rate determined by a timing wave of the same frequency as the repetition rate of said transmitted energy, means automatically varying the phase of said timing wave for unblocking said receiver at the proper time to continually receive energy reflected from said remote object, means indicating range of said remote object as a function of phase of said timing wave and means indicating the accuracy of the last-named means.

22. In an apparatus for continually determining range and azimuth angle of a remote object in space, a receiver, means producing a pair of juxtapositoned directional energy beams with each beam including intermittent energy portions, means intermittently unblocking said receiver for an interval of substantially the same order of duration as said energy portions at a rate determined by a timing wave of a frequency equal to the repetition rate of said energy portions, means automatically varying the phase of said timing wave to unblock the receiver at the proper time to receive energy reflected from a remote object impacted by said beams, means automatically varying the bearing of said beams as a unit in response to reception of reflected energy of different power from said beams to continually maintain said beams equally distant from said remote object, means indicating range of said remote object as a function of phase of said timing wave, means indicating the accuracy of said range indication, means determining the azimuth angle of said remote object from the bearing of said beams and means indicating the accuracy of the last-named means.

23. In an automatic bearing follow-up system, a rotatable directional beam antenna, means producing a pair of directional energy beams from said antenna diametrically spaced at equal angles with respect to the normal axis of the antenna, receiver means for the energy of each of said beams reflected from a remote object, a pair of detector means for separating the received energy of one of said beams from the received energy of the other of said beams, a differential circuit connected to the output of said detector means, a motor responsive to the output of said circuit for varying the bearing of said antenna in accordance with unequal output of said detector means for maintaining the normal axis of said antenna directed toward said remote object and means responsive to the output of said circuit for maintaining other elements directed toward said remote object.

24. In an automatic bearing follow-up system, a rotatable directional beam antenna, means producing a pair of directional energy beams from said antenna diametrically spaced at equal angles with respect to the normal axis of the antenna, receiver means for the energy of each of said beams reflected from a remote object, a pair of detector means for separating the received energy of one of said beams from the received energy of the other of said beams, a differential circuit connected to the output of said detector means, a motor responsive to the output of said circuit for varying the bearing of said antenna in accordance with unequal output of said detector means for maintaining the normal axis of said antenna directed toward said remote object and an oscillograph for producing an indication in accordance with the output of said circuit which indicates the relative position of said remote object with respect to said beams.

25. In an automatic range follow-up system, means transmitting a series of equally spaced energy pulses, a normally blocked receiver for said energy, means intermittently unblocking said receiver for an interval of substantially the same order of duration as said pulses at a rate corresponding to a timing wave of a frequency equal to the repetition rate of said pulses, means generating a reference signal at the intermediate instant of each unblocked interval of said receiver, means determining the phase difference between said reference signal and energy reflected a remote object received during said unblocked interval, means varying the phase of said timing wave, means automatically controlling the last-named means in accordance with lack of phase correspondence between said reference signal and received reflected energy for varying the time at which said receiver is unblocked whereby said reflected energy is continually received in phase with said reference signal and means indicating range of said remote object from said phase varying means.

26. In an automatic range follow-up system, an oscillator for generating a timing wave, an energy transmitter, means responsive to said timing wave for controlling operation of said transmitter whereby the latter produces a series of energy pulses at a rate determined to said timing wave, a normally blocked receiver, a circuit for producing an unblocking signal in accordance with said timing wave, means applying said unblocking signal to said receiver whereby the latter is rendered in a condition to receive energy for a short time interval whenever an energy pulse is transmitted, a device for varying the phase of the timing wave that controls operation of said circuit to vary the time at which said receiver is rendered in said condition with respect to the time an energy pulse is transmitted, means automatically controlling said device to vary the phase of said timing wave until energy reflected from a remote object impacted by said energy pulses is received during said intervals and means responsive to reception of reflected energy during said intervals for automatically controlling said device whereby the receiver is rendered in said condition at the proper time to continually receive energy reflected from said remote object.

27. In an automatic range follow-up system, an oscillator for generating a timing wave, an energy transmitter, means responsive to said timing wave for controlling operation of said transmitter whereby the latter produces a series of energy pulses at a rate determined by said timing wave, a normally blocked receiver, a circuit for producing an unblocking signal in accordance with said timing wave, means applying said unblocking signal to said receiver whereby the latter is rendered in a condition to receive energy for a short time interval whenever an energy pulse is transmitted, a device for varying the phase of the timing wave that controls operation of said circuit to vary the time at which said receiver is rendered in said condition with respect to the time an energy pulse is transmitted, means automatically controlling said device to vary the phase of said timing wave until energy reflected from a remote object impacted by said energy is received during said intervals, means responsive to reception of reflected energy during said intervals for automatically controlling said device whereby the receiver is rendered in said condition at the proper time to continually receive energy reflected from said remote object, an oscillograph, means producing a sweep of the electron beam of said oscillograph in synchronism with operation of said circuit and means applying the received reflected energy to said oscillograph for producing an indication on said sweep which indicates the time reflected energy is received during said intervals.

28. In an automatic range and bearing follow-up system, an oscillator for producing a timing wave, an energy transmitter for simultaneously producing a pair of energy pulses at different frequencies at a rate determined by said timing wave, a rotatable directional beam antenna, means feeding the output of said transmitter to said antenna in such a manner that the latter produces a pair of directional energy beams diammetrically spaced at equal angles with respect to the normal axis of the antenna, a normally blocked receiver, a circuit for producing an unblocking signal in accordance with said timing wave, means applying said unblocking signal to said receiver to render the latter in a condition to receive energy for a short interval whenever said pulses are transmitted, a device for varying the phase of the timing wave that controls operation of said circuit to vary the time said receiver is rendered in said condition with respect to the time an energy pulse is transmitted, means automatically controlling said device to vary the phase of said timing wave until energy reflected from a remote object impacted by said beams is received during said intervals, means responsive to reception of energy during said intervals for automatically controlling said device whereby the receiver is rendered in said condition at the proper time to continually receive energy reflected from said remote object, a pair of detector means for separating the received reflected energy at one frequency from the received reflected energy at the other frequency, a differential circuit connected to the outputs of said detector means and a motor responsive to the output of said differential circuit for varying the bearing of said antenna in accordance with the unequal output of said detector means for maintaining the normal axis of said antenna directed toward said remote object.

29. In an automatic range follow-up system, means transmitting a series of equally spaced energy pulses, a normally blocked receiver for said energy, means intermittently unblocking said receiver for an interval of substantially the same order of duration as said pulses at a rate determined by a timing wave of a frequency equal to the repetition rate of said transmitted pulses, a cathode ray oscillograph, a circuit for producing a sweep of the electron beam of said oscillograph for a period of time equal to the unblocked interval of said receiver at a rate determined by said timing wave, means associated with said oscillograph for generating a reference signal at the intermediate instant of each of said sweeps, means determining the phase difference between said signals and energy reflected from a remote object received during the unblocked intervals of said receiver, means responsive to a phase difference between said received energy and said reference signals for automatically varying the phase of said timing wave to automatically continually unblock the receiver at the proper time to receive reflected energy in phase with said reference signal.

30. In an automatic follow-up system, a pair of directional beam antennae, a series of equally spaced energy pulses, means alternately applying said pulses to said antennae, one of said antennae including means responsive to application of said pulses for producing a pair of juxtapositioned directional energy beams from said one antenna, the other of said antennae including means responsive to application of said pulses for producing a pair of juxtapositioned directional energy beams from said other antenna in quadrature with the beams from said one antenna, a receiver for energy of said beams reflected from a remote object impacted by said beams, detector means for separating the received energy of one beam of each of said pair of pulses from the received energy of the other beam of each of said pair of pulses, a differential circuit for producing an output in response to an unequal output of said detector means, a pair of directional control mechanisms, means alternately feeding the output of said differential circuit to said control mechanisms, motor means responsive to the output of one of said control mechanisms for rotating the antennae in a vertical plane and motor means responsive to the output of the other control mechanism for rotating the antennae in a horizontal plane whereby the antennae are continually directed toward said remote object.

31. In an automatic follow-up system, a directional antenna, means mounting said antenna for rotation in a pair of planes at right angles to each other, means producing a directional energy beam from said antenna, means conically rotating said directional energy beam, a cathode ray oscillograph having a plurality of deflecting means, receiver means for energy reflected from a remote object included within the circular path of said beam, means applying said received energy to said deflecting means for sweeping the electron beam of said oscillograph in accordance therewith for producing an indication which indicates the position of the remote object with respect to the circular path of the conically rotating beam, means responsive to a voltage difference between one pair of said deflecting means for varying the position of said antenna in one plane and means responsive to a voltage difference between another pair of said deflecting means for varying the position of said antenna in another plane whereby the circle followed by said beam is maintained equally distant from said object.

32. In a circuit for maintaining a generated signal in phase with a received signal, a normally blocked receiver, an unblocking signal of a predetermined interval, means applying said unblocking signal to said receiver for rendering the receiver in a condition to receive energy for said predetermined interval, means delaying said unblocking signal for producing a reference signal that initiates at the immediate instant of the unblocked interval of said receiver, means shaping said reference signal and a signal received during said unblocked interval to the same form, a differential circuit responsive to application of said reference signal and said received signal for producing an output in accordance with a phase difference between said signals and means responsive to an output of said differential circuit for varying the time said generated signal is produced to maintain said reference signal in phase with said received signal.

33. In combination, means for transmitting from a point to an object distant from said point a series of radio frequency pulses spaced apart in time, means at said point for receiving reflections or echoes of said pulses from said object and impressing them upon circuit control means, means at said point for generating a second train of pulses, means for applying said second train of pulses to said circuit control means, means responsive to said circuit control means for automatically tracking said object by continuously indicating the distance between the point and the object as long as the pulses of said first train of energy pulses are above a predetermined amplitude level, and means for producing an indication that said last-mentioned means is giving a correct reading within a predetermined margin of error.

34. In an object detecting and automatic range tracking system, means for radiating a series of pulses of electromagnetic energy of desired duration, means for receiving echoes of said pulses from one or more objects or targets, means for producing a second series of pulses each pulse of which is delayed a variable time period after the moment of radiation of a corresponding one of said first mentioned series of pulses, and servo motive means responsive jointly to the delayed pulses and to the received echoes to vary said time delay periods so that a predetermined relationship is maintained between the time of reception of an echo from a selected target and the time of formation of the delayed pulse which corresponds to the radiated pulse producing this echo.

References Cited in the file of this patent

UNITED STATES PATENTS

| | | |
|---|---|---|
| 1,387,850 | Hammond | Aug. 16, 1921 |
| 1,924,174 | Wolf | Aug. 29, 1933 |
| 2,055,883 | Terry | Sept. 29, 1936 |
| 2,063,534 | Wallace | Dec. 8, 1936 |
| 2,083,242 | Runge | June 8, 1937 |
| 2,166,991 | Guanella | July 25, 1939 |
| 2,176,469 | Moueix | Oct. 17, 1939 |
| 2,227,598 | Lyman et al. | Jan. 7, 1941 |
| 2,277,464 | Taylor | Mar. 24, 1942 |
| 2,407,198 | Wolff | Sept. 3, 1946 |
| 2,412,612 | Godet | Dec. 17, 1946 |
| 2,423,644 | Evans | July 8, 1947 |
| 2,445,213 | Evans | July 13, 1948 |
| 3,103,661 | Hahn | Sept. 10, 1963 |